(12) United States Patent
Mercer

(10) Patent No.: US 9,309,004 B2
(45) Date of Patent: Apr. 12, 2016

(54) CENTRIPETAL ACCELERATION DETERMINATION, CENTRIPETAL ACCELERATION BASED VELOCITY TRACKING SYSTEM AND METHODS

(71) Applicant: Merlin Technology, Inc., Kent, WA (US)

(72) Inventor: John E. Mercer, Gig Harbor, WA (US)

(73) Assignee: Merlin Technology, Inc., Kent, WA (US)

( * ) Notice: Subject to any disclaimer, the term of this patent is extended or adjusted under 35 U.S.C. 154(b) by 192 days.

(21) Appl. No.: 14/032,375

(22) Filed: Sep. 20, 2013

(65) Prior Publication Data

US 2014/0088800 A1   Mar. 27, 2014

Related U.S. Application Data

(60) Provisional application No. 61/704,338, filed on Sep. 21, 2012.

(51) Int. Cl.
*B64D 43/02* (2006.01)
*G01P 5/00* (2006.01)
*G01P 7/00* (2006.01)

(52) U.S. Cl.
CPC . *B64D 43/02* (2013.01); *G01P 5/00* (2013.01); *G01P 7/00* (2013.01)

(58) Field of Classification Search
CPC ........... B64D 43/02; B64D 43/00; G01P 7/00
USPC ............... 701/2, 7, 10, 14, 120, 121, 122
See application file for complete search history.

(56) References Cited

U.S. PATENT DOCUMENTS 3,052,122 A * 9/1962 Westerback ............... 73/178 R
6,722,610 B1   4/2004 Rawdon et al.
(Continued)

FOREIGN PATENT DOCUMENTS

EP   2348285 A2   7/2011
RU   2116666 C1   7/1998
RU   2331847 C2   8/2008

OTHER PUBLICATIONS

The International Search Report and the Written Opinion of the International Searching Authority for International Application No. PCT/US2013/061218 which is associated with U.S. Appl. No. 14/032,375, Jan. 16, 2014, Moscow, Russia.
(Continued)

*Primary Examiner* — Helal A Algahaim
*Assistant Examiner* — Genna Mott
(74) *Attorney, Agent, or Firm* — Pritzkau Patent Group, LLC

(57) ABSTRACT

The flight of an aircraft is characterized in terms of Earth-based reference system data for a first position and a second position of the aircraft that are separated by a time increment. A centripetal acceleration of the aircraft is determined based on the Earth-based reference system data for the positions in conjunction with the time increment. A rate of rotation is established corresponding to the time increment in an aircraft-based reference system. Aircraft airspeed is determined based on the centripetal acceleration and the rate of rotation. A turn can be detected as characterized by a change in track angle from a prior GPS packet compared to a new packet. Aircraft turns can be detected based on a change in track angle in GPS packets. Compensation can be applied to a gyro based on centripetal acceleration such that the gyro more accurately responds to the Earth gravity axis.

35 Claims, 12 Drawing Sheets

(56) References Cited

U.S. PATENT DOCUMENTS

| | | |
|---|---|---|
| 7,954,614 B2 | 6/2011 | Mercer |
| 2003/0193411 A1* | 10/2003 | Price ............................ 340/973 |
| 2005/0256640 A1* | 11/2005 | Sigurdsson et al. .......... 701/213 |
| 2006/0217852 A1* | 9/2006 | Price ..................... G01C 19/42 701/4 |
| 2008/0255795 A1* | 10/2008 | Shkolnikov ................... 702/141 |
| 2010/0168939 A1* | 7/2010 | Doeppner et al. .............. 701/16 |
| 2010/0211270 A1* | 8/2010 | Chin et al. ..................... 701/44 |
| 2011/0121992 A1* | 5/2011 | Konaka et al. ................ 340/905 |
| 2011/0184592 A1* | 7/2011 | Elias et al. ........................ 701/7 |
| 2013/0096731 A1* | 4/2013 | Tamari et al. ..................... 701/1 |
| 2014/0027564 A1 | 1/2014 | Mercer et al. |
| 2014/0027565 A1 | 1/2014 | Marvin et al. |
| 2014/0027566 A1 | 1/2014 | Mercer et al. |

OTHER PUBLICATIONS

Saveliev I.V. Kurs fiziki. Mekhanika. Molekulyarnaya fizika. Tom 1, Moskva "Nauka", 1989, pp. 28-33, No Translation, the International Search Report of the International Searching Authority for International Application No. PCT/US2013/061218.

William Premerlani, Wind Estimation without an Airspeed Sensor, Jan. 29, 2010, http://diydrones.com, UAV Dev Board.

William Premerlani, IMU Wind Estimation (theory), Jan. 29, 2010, http://diydrones.com, UAV Dev Board.

\* cited by examiner

CENTRIPETAL ACCELERATION DETERMINATION, CENTRIPETAL ACCELERATION BASED VELOCITY TRACKING SYSTEM AND METHODS

RELATED APPLICATION

The present application claims priority from U.S. Provisional Patent Application Ser. No. 61/704,338 filed on Sep. 21, 2012 and which is hereby incorporated by reference in its entirety.

BACKGROUND

The present application is generally related to a system, instruments and methods for monitoring the flight of an aircraft and, more particularly, to an advanced system, apparatus and methods for monitoring the flight of the aircraft based on a determination of centripetal acceleration.

In one aspect of the prior art, modern aircraft and other vehicles such as boats and ships often include one or more GPS (Global Positioning System) receivers for purposes of monitoring the progress and movement of a craft. Applicant recognizes, however, that a GPS receiver is ineffective in terms of characterizing movement of an ambient that supports the moving craft such as, for example, air or water. Using the example of an aircraft, it can be critical to know the airspeed of the aircraft, especially in windy conditions, for purposes of avoiding operation of the aircraft beyond its design limits. As will be further discussed below, attempting to maintain a constant GPS groundspeed of an aircraft subject to a tail wind can result in exceeding the airspeed design limits of the aircraft when turning from downwind to upwind.

One approach for avoiding airspeed design limitations resides in providing an airspeed sensor such as, for example, a pitot tube. While such sensors are generally effective, it should be appreciated that the cost for the addition of such a sensor is not trivial. Further, airspeed sensors can be subject to failure. For example, a pitot tube can be subject to icing over or becoming clogged with other foreign material. Thus, even in an aircraft that includes an airspeed sensor, Applicants recognize that an additional system for independently determining airspeed can be valuable.

One recent approach for determining airspeed without using an airspeed sensor is described in a posting entitled *Wind estimation without an airspeed sensor*(http://diydrones.com/forum/topics/wind-estimation-without-an, dated Jan. 29, 2010). This approach, however, must utilize a pair of GPS readings in conjunction with a direction cosine matrix for purposes of estimating the airspeed. It should be appreciated that the formation of the cosine matrix is not trivial and requires measurements along all three axes of rotation. In a typical implementation, triaxial rate gyros or triaxial attitude gyros and triaxial accelerometers, and triaxial magnetometers are needed in conjunction with the GPS for slaving the rate gyros. Triaxial rate gyros and triaxial accelerometers are not normally included as standard equipment in an aircraft's equipment.

In another aspect of the prior art, a gyro is sometimes used to augment a magnetic compass to form what can be referred to as a slaved gyro. As will be further discussed, the reference for this slaved gyro should be the Earth's gravitational vector, so that a turn is represented by the slaved gyro in the Earth's gravitational axis system. Unfortunately, however, centripetal acceleration during a turn produces an acceleration that adds to the gravitational acceleration when an aircraft makes a coordinated turn such that the total acceleration is towards the floor of the aircraft. Applicant recognizes that slaving a gyro to this apparent acceleration can be problematic since the gyro will tend to shift to an axis as a reference which is perpendicular to the floor of the aircraft in a turn, if the aircraft executes a turn of sufficiently long time duration unless the centripetal acceleration factor is compensated.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In one aspect of the present disclosure, a method and associated apparatus are described for determining an airspeed of an aircraft in flight during a turn. The flight of the aircraft is characterized in terms of Earth-based reference system data for a first position and a second position of the aircraft that are separated by a time increment. A centripetal acceleration of the aircraft is determined based on the Earth-based reference system data for the first and second positions in conjunction with the time increment. A rate of rotation is established corresponding to the time increment in an aircraft-based reference system. The airspeed is determined based on the centripetal acceleration and the rate of rotation.

In another aspect of the present disclosure, a method and associated apparatus are described for monitoring the flight of an aircraft, the aircraft carrying a GPS system which outputs GPS data as a series of GPS packets for selective use as Earth-based reference system data. At least selected ones of the series of GPS packets are periodically monitored to serve as the Earth-based reference system data for detecting that the aircraft is engaged in a turn based on a track angle that forms part of each GPS packet. A turn is detected as characterized by a change in the track angle from a prior packet corresponding to a prior position of the aircraft to a new packet corresponding to a new position of the aircraft. A centripetal acceleration is determined based on the prior packet, the new packet and a time increment that separates the prior packet and the new packet. A rate of rotation corresponding to the time increment in an aircraft-based reference system is established. The airspeed is determined based on the centripetal acceleration and the rate of rotation.

In still another aspect of the present disclosure, an instrument is described including a GPS receiver for characterizing the movement of a craft in terms of Earth-based reference system data for a first position and a second position of the craft that are separated by a time increment. At least a selected one of (i) a heading gyro provides a heading output for tracking a heading of the craft in a craft-based reference system and (ii) a rate sensor monitors a rate of change of a yaw orientation of the craft in the craft-based reference system. A processor is configured for determining a centripetal acceleration based on the Earth-based reference system data for the first and second positions in conjunction with the time increment, establishing a rate of rotation corresponding to the time increment in the craft-based reference system at least based on the heading output if the heading gyro is selected or at least based on the rate of change of the yaw orientation if the rate sensor is selected, and a velocity of the craft in a turn is determined based on the centripetal acceleration and the rate of rotation.

In yet another aspect of the present disclosure, a method and associated apparatus are described for monitoring the flight of an aircraft, the aircraft carrying a GPS system which outputs GPS data as a series of GPS packets. Selected ones of the series of GPS packets are at least periodically monitored for detecting that the aircraft is engaged in a turn based on a track angle that forms part of each GPS packet as characterized by a change in the track angle from a prior packet corresponding to a prior position of the aircraft to a subsequent packet corresponding to a subsequent position of the aircraft. Responsive to detecting a turn, a centripetal acceleration of the aircraft is determined based on the prior packet, the subsequent packet and a time increment that separates the prior packet and the subsequent packet. A rate of rotation of the aircraft is established corresponding to the time increment in an aircraft-based reference system. An airspeed of the aircraft is determined based on the centripetal acceleration and the rate of rotation.

In a continuing aspect of the present disclosure, a method and associated apparatus are described in which the flight of an aircraft is characterized during a turn in terms of Earth-based reference system data for a first position and a second position of the aircraft that are separated by a time increment. A centripetal acceleration of the aircraft is determined responsive to the turn based on the Earth-based reference system data for the first and second positions in conjunction with the time increment. Compensation is applied to a gyro that is intended to slave to the Earth gravity axis based on the centripetal acceleration such that the gyro more accurately responds to the Earth gravity axis.

BRIEF DESCRIPTION OF THE DRAWINGS

Embodiments are illustrated in referenced figures of the drawings. It is intended that the embodiments and figures disclosed herein are illustrative rather than limiting.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiments shown, but is to be accorded the widest scope consistent with the principles and features described herein including modifications and equivalents. It is noted that the drawings may not be to scale and may be diagrammatic in nature in a way that is thought to best illustrate features of interest. Descriptive terminology may be adopted for purposes of enhancing the reader's understanding, with respect to the various views provided in the figures, and is in no way intended as being limiting.

Figure 1:
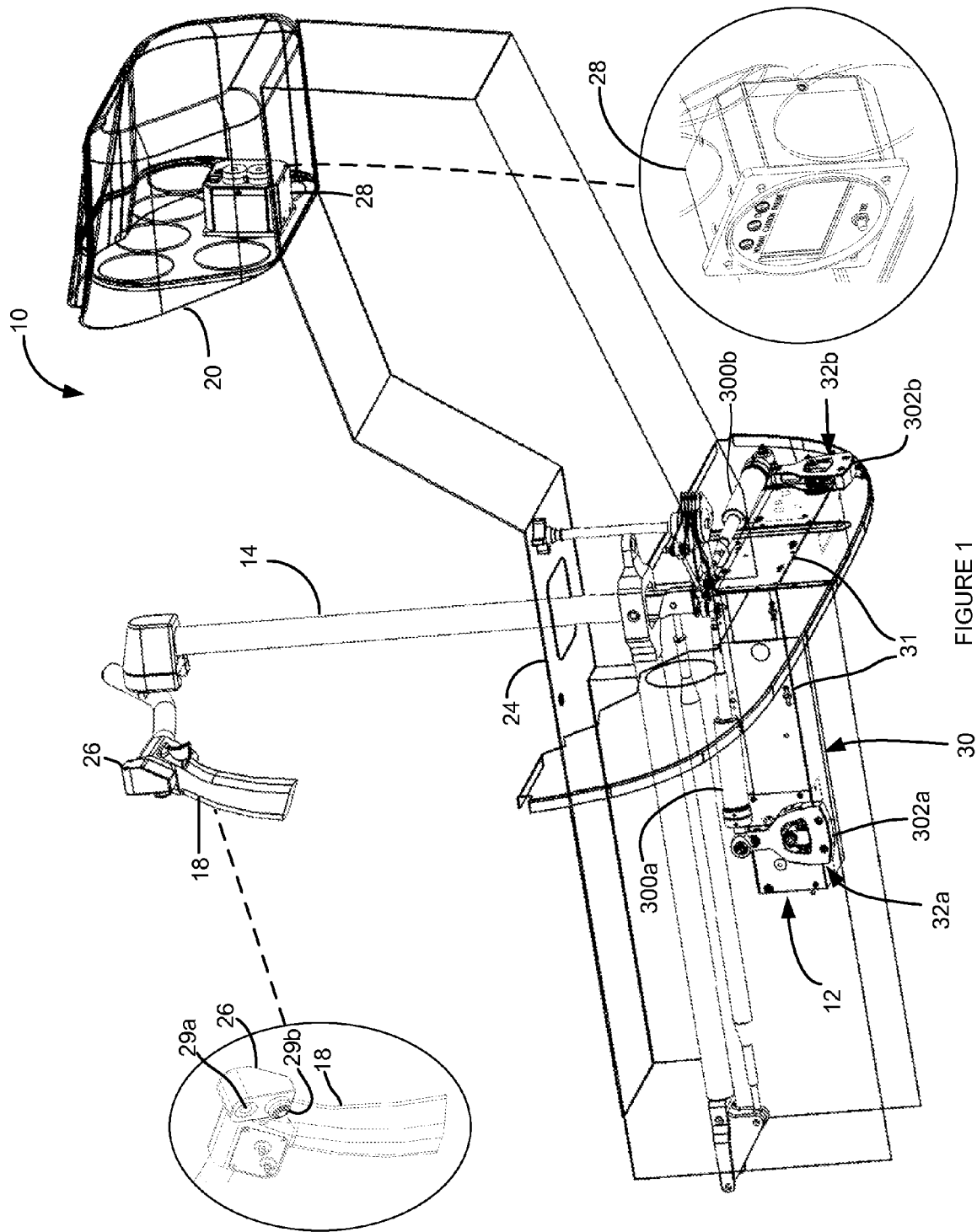
FIG. 1 is a diagrammatic perspective, partial view of a helicopter including components of an autopilot system for purposes of serving as a framework for the discussion of centripetal acceleration determination according to the present disclosure as well as its various applications.

FIG. 1 is a perspective, partial view of a helicopter 10, shown here for purposes of illustrating various components of an embodiment of an autopilot system 12 in relation to the helicopter. It should be appreciated that much of the physical structure of the helicopter itself has been rendered as invisible in FIG. 1 for purposes of illustrative clarity, however, it is understood that this structure is present. The autopilot of the present disclosure is electromechanical and can provide flight control of a helicopter without requiring a hydraulic flight control system. The helicopter can be, by way of non-limiting example, a Robinson R22 helicopter. The teachings that are brought to light herein, however, can readily be adapted for use with any suitable helicopter, either currently available or yet to be developed. For example, the autopilot of the present disclosure can be used with helicopters having hydraulic cyclic assistance, as will be further described below.

Helicopter 10 includes a stick or cyclic 14 having a control handle or grip 18 that is configured for engagement with the hand of a pilot. As will be appreciated by one of ordinary skill in the art, stick 14 can be moved fore and aft (toward and away from an instrument console 20) to control pitch of the helicopter and transversely for purposes of controlling roll of the helicopter in a coordinated manner to produce controlled flight. Additional control inputs are provided by the pilot via a pair of pedals in order to control the yaw orientation of the helicopter by changing the pitch of a tail rotor. It is noted that these yaw orientation control components have not been shown since they are not controlled by the autopilot of the present disclosure. Further, the pilot also remains in control of the collective of the helicopter as well as the throttle settings. The autopilot of the present disclosure, however, can exert full control authority over stick 14 by moving the stick in any direction to the limits of its travel under appropriate circumstances. Stick 14 passes below a deck 24 of the helicopter and engages pitch and roll linkages of the helicopter in a manner that is familiar to one of ordinary skill in the art so as to control cyclic actuation of the main rotor of the helicopter. The term "cyclic" refers to the variation in pitch of the rotor blades of the helicopter on a per revolution basis. In this regard, cyclic control can refer to manipulation of the stick or the stick itself can be referred to as the cyclic. An autopilot display processor unit (ADPU) 28 can be mounted in instrument console 20 to provide indications to the pilot as well as to provide processing capability and other capabilities, as will be further described.

The cyclic, in particular, handle 18 includes a Switch Module Assembly 26 that can be mounted as shown. Details of handle 18 are shown in a further enlarged inset view. The switch module can contain switches including an engage/disengage switch 29a and a trim/mode "top-hat" switch 29b (4-way with a center contact). The top-hat switch allows the pilot to trim the course, speed and altitude. In another embodiment 5 independent switches can replace the top-hat switch. There can be a time-out feature in the autopilot processor which prevents switch faults or wiring faults from causing continuous trimming. The mode switch can select and deselect altitude, speed, hover or position hold modes based on current flight condition.

Still referring to FIG. 1, autopilot 12 implements cyclic control through a number of component assemblies that are appropriately located on the helicopter. A main autopilot unit 30 is located below the main deck of the helicopter. In the present embodiment, main unit 30 includes an L-shaped enclosure 31 that supports electronics as well as a pitch control linkage 32a and a roll control actuator linkage 32b, which may be referred to generally or collectively by the reference number 32. Each of these linkages includes an actuator that is located within the main unit enclosure, as will be further described. A distal end of each of the linkages engages the lowermost end of stick 14 to implement what is known as a parallel control system. In this regard, it should be appreciated that the original cyclic control linkages of helicopter 10 between stick 14 and the rotor remain intact. That is, inputs from the helicopter pilot as well as the autopilot are input directly to the stick. Details with respect to the pitch and roll control linkages provide for a parallel control input arrangement. A series type autopilot control system, in contrast, requires breaking the original cyclic control linkages of the helicopter between the stick and rotor such that the autopilot actuators can be inserted into the break.

Figure 2:
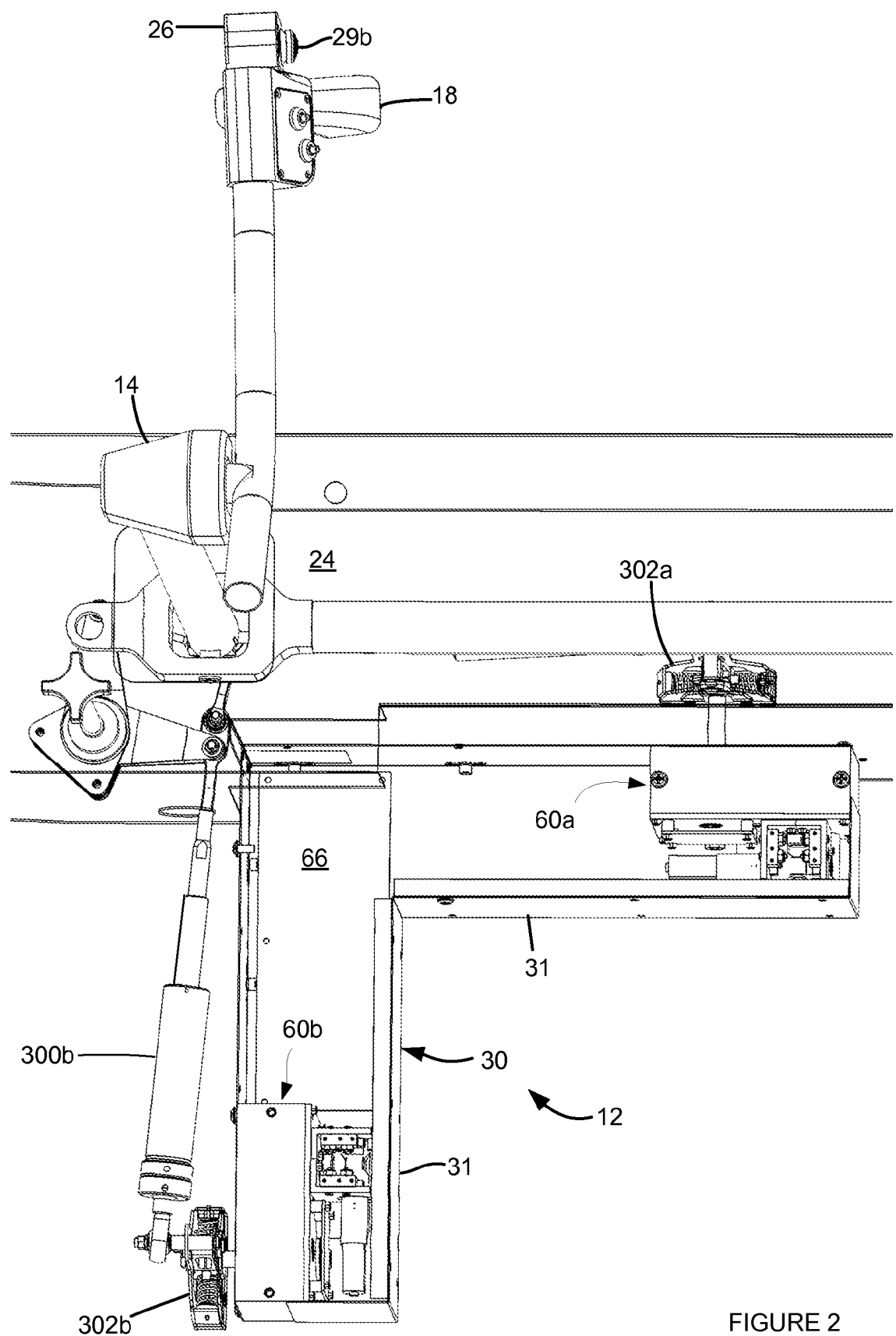
FIG. 2 is an overhead diagrammatic perspective, partial view of the helicopter of FIG. 1, shown here to illustrate further details with respect to components of the system of the present disclosure.

Turning to FIG. 2, components of the helicopter and autopilot are shown in an overhead perspective view. In this view, a pitch actuator 60a and a roll actuator 60b (which may be referred to generally or collectively by the reference number 60) can be seen within L-shaped enclosure 31 with the lid of the enclosure rendered transparent. Main unit electronics 66 are located within the enclosure and are suitably electrically interfaced (not shown) both externally and to the actuators.

Figure 3:
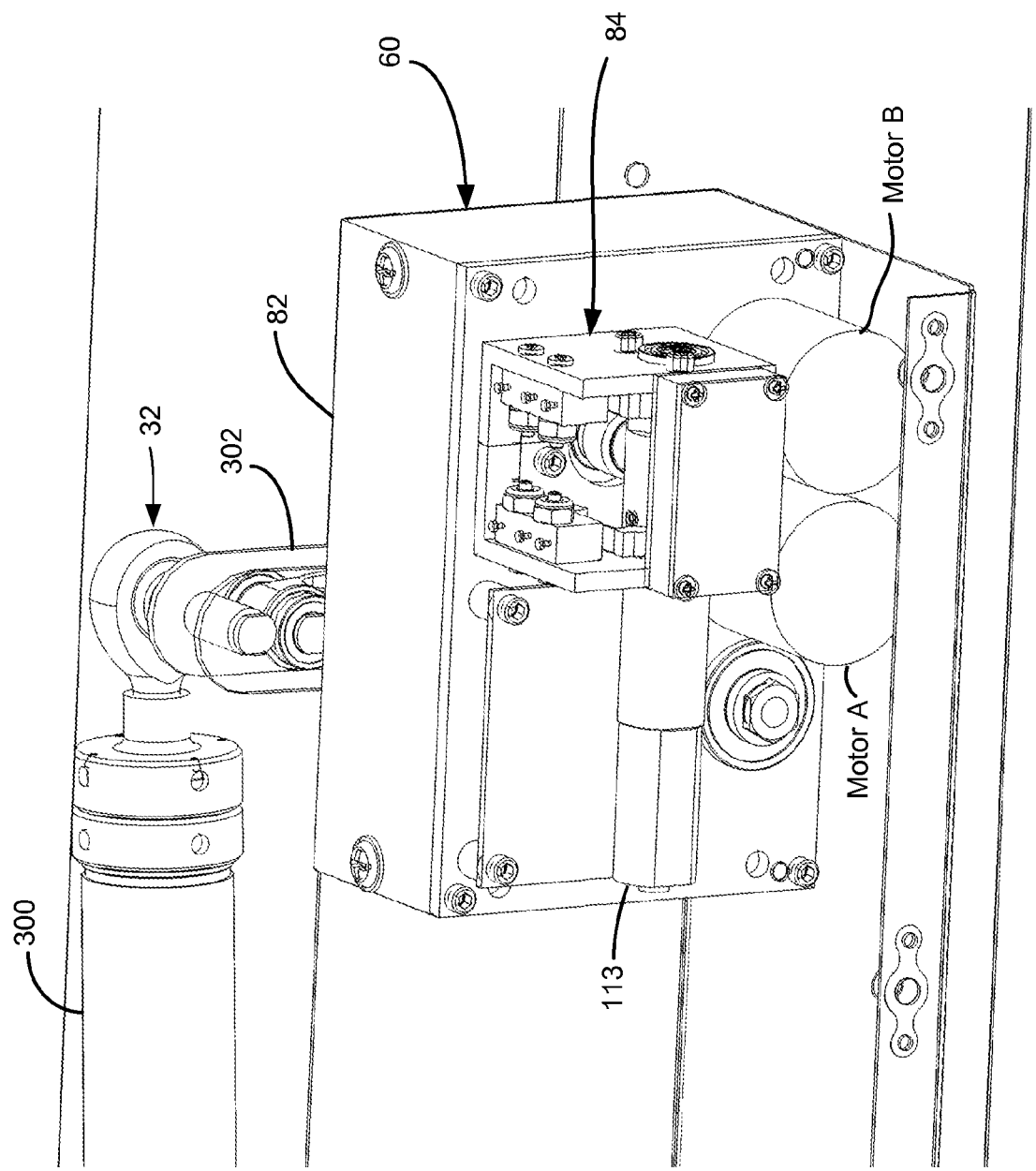
FIG. 3 is a diagrammatic, perspective partial view of an embodiment of an actuator and an embodiment of a force limited link that can serve as components of the system of the present disclosure.

Referring to FIG. 3, an embodiment of actuator 60 that can be used for the pitch and roll actuators throughout this disclosure is seen in a perspective view installed within enclosure 31 and connected to a control linkage 32. Each actuator includes a housing 82 having a gear arrangement, yet to be illustrated, within the housing, dual motors Motor A and Motor B, and a clutch arrangement 84 for selectively engaging and disengaging the motors to rotate an output shaft which is not visible on the opposite side of housing 82. As will be seen, the gear arrangement allows motors A and B to simultaneously drive the output shaft or either one of the motors to individually drive the output shaft. In the present embodiment, motors A and B are brushless DC motors having a Y stator winding configuration which requires coordinated inputs to drive the motor phases in a particular sequence. As such, the motors cannot runaway under their own power. The motors include Hall effect sensors that are used for purposes of timing electrical drive pulses to the stator of the motor. Further details with respect to the motors and related drive considerations are provided at one or more appropriate points hereinafter.

Figure 4:
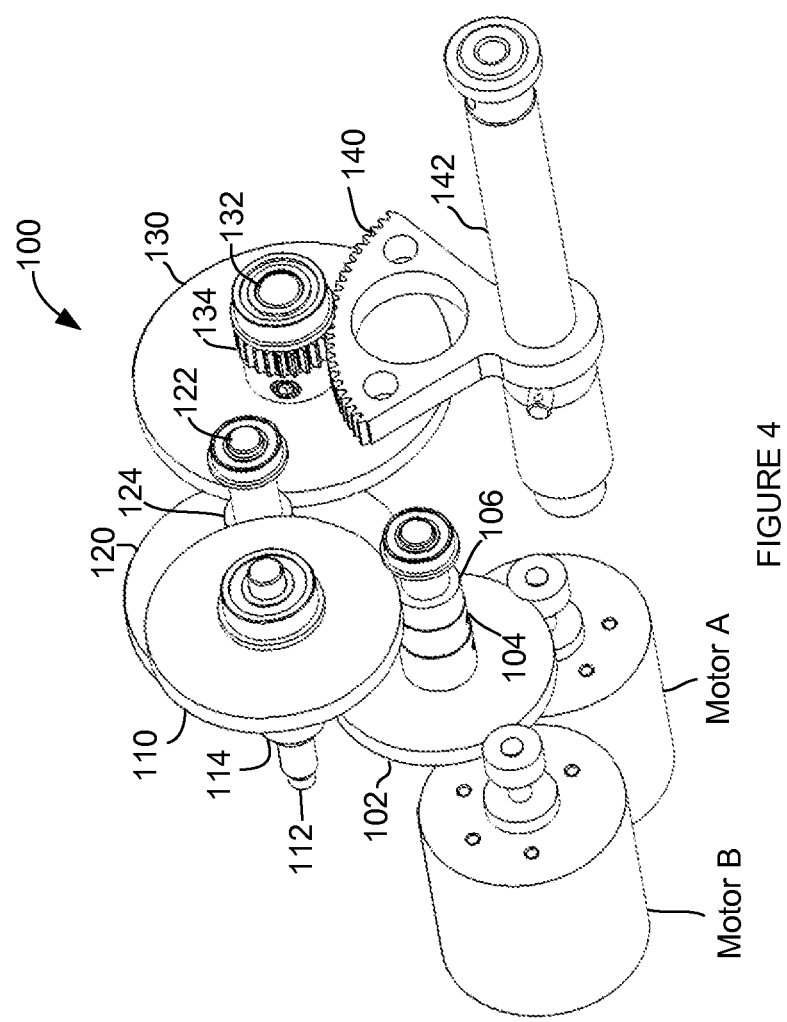
FIG. 4 is a diagrammatic, perspective view of an embodiment of a gear drive arrangement that can form part of the actuator of FIG. 3 along with a redundant pair of actuator drive motors.

FIG. 4 illustrates an embodiment of a gear drive arrangement 100 that can be used in the actuator of FIG. 3. Initially, it is noted that the gear drive arrangement is a multi-stage reduction drive, for example, on the order of about 1750:1. Also, teeth have not been illustrated on a number of the gears to be described, but are understood to be present. Other embodiments may not require gears with teeth. Motors A and B have output shafts supporting gears that engage a gear 102 on a first shaft 104. An opposing end of shaft 104 supports a smaller gear 106 that drives a gear 110 that is supported on a second shaft 112 which also supports a smaller gear 114 (partially hidden in the view of the figure). It is noted that shaft 112 can comprise a clutch shaft that can move laterally to selectively engage or disengage the actuator motors from the remaining gears of the gear drive. A suitable clutch arrangement is described, for example, in U.S. Pat. No. 7,954,614 which is incorporated by reference. The clutch arrangement relies upon movement of the clutch shaft along its elongation axis by using a permanent magnet that is mounted on a distal end of the shaft. A clutch actuator 113 (FIG. 3) can selectively move (for example, rotate) another permanent magnet in relation to the clutch shaft mounted permanent magnet such that the clutch shaft is magnetically biased to move between an engaged position and a disengaged position. The clutch shaft remains in a current operational position despite a power failure. Gear 114, in turn, selectively drives a gear 120 that is supported on a third shaft 122. The latter also supports a smaller gear 124 that drives a gear 130 that is supported on a forth shaft 132. The forth shaft, in turn, supports a smaller gear 134 which is arranged to rotate an output gear 140 that is supported on an output shaft 142 of the actuator. The output gear is configured to provide sufficient rotation to move stick 14 through its full range of motion. In an embodiment, the actuators of the present disclosure are sufficiently robust, in terms of the generated level of actuation force, so as to be capable of controlling the cyclic of a hydraulically equipped helicopter through a failed hydraulic system. For example, actuator 60 is capable of applying forces of at least 100 pounds to the cyclic. While the present embodiment has been designed to provide actuation forces at this level, it should be appreciated that in another embodiment, significantly higher force can be provided since the geared motor drive of the actuator arrangement that has been brought to light herein is capable of providing forces at the output shaft of the actuator as high as 300 pounds. As seen in FIGS. 1 and 2, the actuator forces are applied to the bottom of the cyclic whereas pilot forces are applied to the top of the cyclic. Accordingly, the pilot is provided with a mechanical advantage due to the different lever-arm lengths. On the R22 helicopter, the mechanical advantage that the pilot has at the top of the stick compared to the bottom of the stick where the actuators are attached is roughly 7:1. In such a case, an actuator applied force of 100 pounds is equivalent to about 14 pounds of pilot applied force. Similarly, while the actuator can generate very large forces, the force-limited-link that is described below generally will not transmit forces of such a magnitude through to the base of the cyclic, unless a much stiffer force-limited link is installed.

Figure 5:
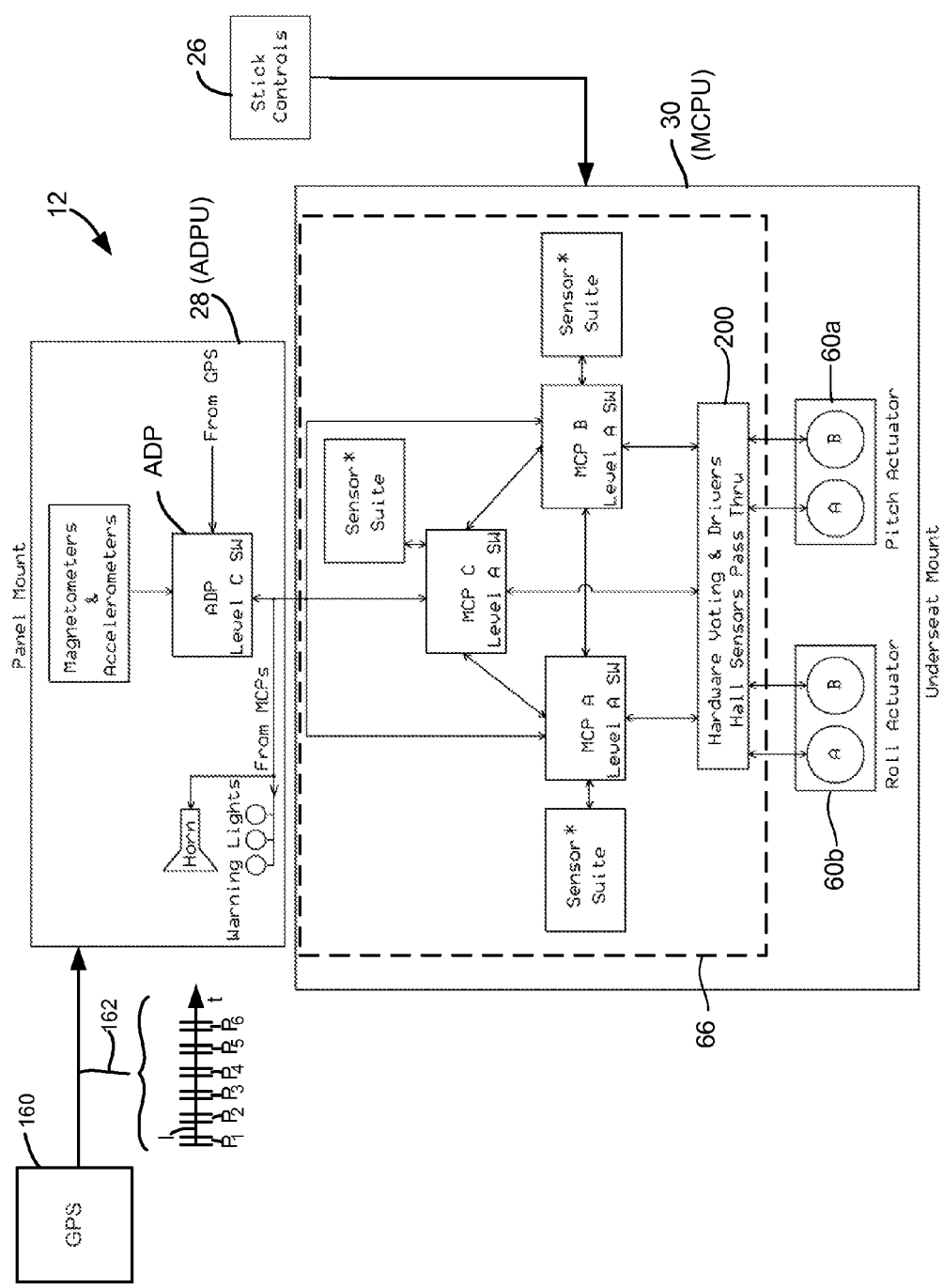
FIG. 5 is a block diagram that illustrates an embodiment of the autopilot system of the present disclosure.

Having described the mechanical components of the autopilot in detail above, it is now appropriate to describe the autopilot in terms of the relationship between the aforedescribed components and related control electronics. In particular, FIG. 5 is an embodiment of a block diagram of autopilot 12. In this regard, main unit 30 comprising enclosure 31, the pitch and roll actuators 60 and electronics 66 may be referred to hereinafter as the Motor Control Processor Unit (MCPU) or main autopilot unit 30. The MCPU includes three microprocessors, each of which may be referred to as a Motor Control Processor (MCP). There are three MCPs, individually designated as MCP A, MCP B and MCP C. These processor units each access a sensor suite of tri-axial MEMS rate sensors and tri-axial MEMS accelerometers. The MCPs are used to provide an inner loop of an overall control system having an inner loop and an outer loop. The MCPs provide commands to brushless DC motors, Motor A and Motor B of pitch actuator 60a and roll actuator 60b, driving the control system for the helicopter. All inter-processor communication can be through a serial bus that is natively supplied on each of the processors. Data integrity can be protected, for example, through the use of a cyclic redundancy check (CRC) incorporated into the data stream.

Each one of the three MCPs can execute identical level "A" software to constitute a triple-redundant system. The motor control processors are interconnected so that they can share data. Each processor reads its sensor suite and compares its data with sensor data coming from the other two processors for purposes of consistency and each motor control processor computes averages of all the corresponding sensors to use for further processing. Sensor data determined to be erroneous is eliminated from the averaging. A warning signal of sound and light can be sent to autopilot display processor unit (ADPU) 28 on instrument panel 20 (FIG. 1). In an embodiment, status lights, best seen in the enlarged inset view of the ADPU in FIG. 1, include green (normal), amber (caution) and red (failure), as well as dual warning horns to provide system status indications. The warning horns also provide system status notifications and alarms along with the status lights. Both the status lights and horns interface directly to the MCPs. In some embodiments, sounds and/or warnings can be transmitted over the helicopter audio system such that notifications can be heard in the pilot's headset as well as being issued from the ADPU. Complementing the status lights and horns is a display which provides current autopilot system settings such as engagement status, course, magnetically slaved gyroscopic heading, speed over ground and any warning messages. Also on the panel is a testing button which initiates an Initiated Built-In Test (IBIT).

The MCPs also read Hall sensor data from the actuator motors, which can be used to indicate the current position of each actuator, and a command signal coming from an autopilot display processor (ADP) which forms part of the ADPU. In this regard, the ADPU serves as the outer control loop to provide command signals to the inner loop. Using all these data, each MCP calculates a control signal for the motors in terms of a PWM (Pulse Width Modulation) and direction of rotation. Each processor also uses the Hall sensor data to control the power connections to the armature of the brushless motors assigned to it. Each MCP compares its PWM command signal and rotation direction for the pitch and roll actuators with commands generated by the other two MCPs for agreement. Since all processors are using the same data to compute motor commands, they should produce identical output signals. Signals for agreement/disagreement with the other two processors are sent to a Hardware Voting circuit 200 that will disable control input capability of any MCP that is in disagreement with the other two MCPs.

It should be appreciated that for a gear ratio of 1750:1, one revolution of the motor rotates the actuator output shaft by only about 0.2 degrees. In and by itself, this resolution can be sufficient for monitoring the actuator output position. For example, rotation of the motor shaft can be detected using a magnet that is mounted on the shaft, as is familiar to one having ordinary skill in the art. In an embodiment, however, Hall sensor data from the motors can be used to determine the incremental position of the actuator output shaft of each actuator. In this regard, each actuator motor includes 3 Hall sensors. The Hall sensor pulses can act like an incremental up/down counter. The position of the arm/output shaft relative to a reference location can be tracked constantly. For example, a zero reference position of the actuator output shaft can be defined when the actuator is engaged via clutch 84. Such zero reference position tracking can be used for certain failures wherein the best approach resides in restoring the actuator shafts to their averaged positions prior to the failure. Since each motor includes 3 Hall sensors and 4 poles, there are 12 Hall state changes per revolution of each motor. Remarkably, by monitoring the Hall state changes, resolution can be increased by a factor of 12 such that a resolution of about 0.017 degrees is provided at the output shaft of the actuator. In an embodiment, a corresponding movement at the top of the stick in FIG. 1 can be about 0.0039 inch.

As described above, each actuator includes motor A and motor B. Each individual motor is controlled by one MCP. Thus only MCP A and MCP B control motors. In particular, MCP A controls motor A in each of pitch actuator 60a and roll actuator 60b, while MCP B controls motor B in each of pitch actuator 60a and roll actuator 60b. MCP C (the third processor) does not control a motor but performs all calculations to generate stick commands as if it were controlling a motor. In this regard, a third motor can readily be added to each actuator (see FIG. 4) that would engage gear 102 in the same manner as motor A and motor B, but responsive to MCP C. The latter, however, votes in a manner that is identical to the other two processors. For example, if MCP A and MCP C agree on the control of the pitch motor, but MCP B does not, then MCP B will be voted out from control of its pitch motor, MCP B will still control its roll motor unless MCP A and MCP C also vote out control of that motor. On the other hand, if MCP C is voted out, no actuator motors will be affected, but a warning light and horn can be actuated as would be the case for the MCPs which control motors. Further details with respect to this architecture are provided hereinafter.

The actuators are designed such that either one of motor A or motor B is independently capable of driving the actuator to control the helicopter. The output shaft of a failed motor will be rotated by the remaining motor. If one of MCP A or MCP B is voted out, the autopilot can continue to function despite the fact that each of these MCPs controls motors. As stated, there can be a warning light and a brief sounding of the horn to notify the pilot that there has been a non-critical autopilot malfunction.

The MCPs have full authority over the controls and are not rate limited. The MCP control section is the only portion of the autopilot that can create a critical or major hazard malfunction. Accordingly, the MCPU is designed as triple-redundant with level "A" designated software for purposes of operating the inner loop of the autopilot. These factors greatly reduce the probability of a critical failure. Applicants recognize, however, that the software corresponding to the outer loop can be partitioned from the inner loop software in a way that allows the outer loop software to be designated at a lower level "C" certification. The outer loop software is handled by the ADP (Autopilot Display Processor) in ADPU 28. The MCPs convert requested autopilot commands from the ADP into actuator control signals that can drive the actuator motors within defined operational limits. In this regard, it should be appreciated that level A software is handled by the triple redundant MCPs while level C, outer loop software is handled by a completely different processor. By way of still further explanation, a single executable runs on each MCP. The MCPs, which may be referred to as the triplex processors, can execute identical software. Thus, the autopilot control laws are partitioned between the ADP and triplex processors. The ADP processes the outer loop dynamics and autopilot modes while the triplex MCPs process the inner loop dynamics. The ADP further provides the pilot's graphical and testing interface to the autopilot and executes the autopilot control laws to determine actuator commands based on sensor and GPS data. A GPS 160 can provide GPS data 162 to ADPU 28. The GPS data is typically provided in packets, indicated as $P_x$ that can be spaced apart in time by an interval I. The GPS data, for example, can include altitude, groundspeed, commands, track angle, latitude and longitude. Generally, the GPS unit will output velocity data to the nearest knot and heading data to the nearest degree. Thus, there can be some amount of rounding error implicated with the use of this data, as will be further discussed. GPS updates, by way of the illustrated packets $P_x$, are received on the basis of a given GPS unit that is in use. Packets can be received relatively rapidly, for example, as often as five per second, however, a longer update interval can be involved. In some embodiments, GPS packets are received at one second or three second intervals. Accordingly, the processor interfaces with the GPS, magnetometer, accelerometer and yaw rate gyro which provide the position, altitude, groundspeed, course and heading data. The ADP monitors the health of these sensors but does not check the validity of the data. The IBIT test switch also interfaces to the ADP. In another embodiment, the ADP can be designed in the same manner as the MCPU with triple redundancy. With both the MCPU and ADP in a triple redundancy configuration, the autopilot can tolerate a single failure in either or both units and still remain fully functional.

The MCPs accept data from the ADP which can include commands as well as data from external GPS 160. The data can be screened by each MCP to detect errors or malfunctions. The control is rate-displacement limited by the MCPs. The MCPs will not allow a command from the ADP to create a hazardous response from the helicopter. GPS and magnetometer data are used in both the MCP and ADP. The GPS and magnetometer data are used in the MCPs to remove drift errors associated with the rate sensors of each sensor suite. The GPS data can also be checked for errors.

The MCPs constantly monitor for both internal and external faults. In the event of an ADP failure, any one MCP can immediately recognize the situation based on update rate and control signal conformity. In response, the MCPU, in one embodiment, will then cause the inner loop to hold the helicopter straight and level. In another embodiment, the MCPU can act in the manner of a SAS (Stability Augmentation System) or a dead reckoning system and control the helicopter based on internal rate signals. The MCPs will attempt to hold zero rates and/or heading and also actuate a horn and light to indicate a failure. It has been empirically demonstrated that the helicopter can maintain prolonged flight with only MCP control, providing more than ample time for the pilot to take control and disengage the autopilot. The ability to detect excessive autopilot response resides in the triplex motor controllers as detailed herein. The triplex processors monitor sensors and also check to confirm that calculated responses are within limits. Pitch and roll commands from the ADP are limited based on such command filtering by each of the triplex processors. Each triplex processor can detect whether a limit has been exceeded and can initiate safe shut down of the autopilot. Pitch and roll axis commands can be monitored identically but with different limit values. The monitors are dynamic; that is, the limit values can be frequency/rate dependent. Redundancy management features for each axis can include stick rate limiting and body rate monitoring.

Each MCP processor can be provided with an independent power supply. A total power failure of the helicopter's electrical power system can cause the actuators to lock in position for about five seconds using a dynamic braking feature that is described in detail below. This five second time period is sufficient for the pilot to take over control. In this regard, the autopilot does not let the cyclic stick flop over by releasing control responsive to a power failure. Even though the actuators are locked, however, the pilot can still perform control over the helicopter since there are override or force limited links 300a (pitch, seen in FIG. 1) and 300b (roll, seen in FIGS. 1 and 2) between each actuator and the cyclic stick. These links are rigid for forces below an unseating value and compliant at higher forces to allow the pilot to safely maneuver and land the helicopter even if disengagement of the system cannot be achieved. It has been empirically demonstrated that a pilot can control the helicopter, including hovering and landing, with both actuators in what is referred to as a "locked" state. The locked state is provided by shorting all windings of the actuator motors and is used in a dynamic braking embodiment described below. The override links are described in detail in a separate patent application. In a helicopter that does not utilize a hydraulic interface to the cyclic, cyclic vibration isolators 302a (pitch) and 302b (roll) can be located on the output shaft of each actuator. The vibration isolators may be optional for use with a helicopter having hydraulic cyclic control since the hydraulic system generally provides damping of cyclic oscillations. The vibration isolators reduce the two per revolution oscillating motion, that is present in the R22 rotorcraft control linkage and other light helicopters, to prevent vibratory loads on the rotorcraft control and to increase the fatigue life of the actuator components. The cyclic vibration isolators are described in detail in a separate patent application.

The sensor suite of each MCP can also include memory such as, for example, EEPROM or other suitable memory. If there is an error detected by an MCP during operation, the error code can be stored in the EEPROM of the sensor suite associated with the MCP. The EEPROM can later be read in the context of determining the cause of failure. The EEPROMs can also contain parameters specific to the model of the helicopter in which the autopilot is installed such as, for example, control loop constants and sensor offsets and gains.

Figure 6:
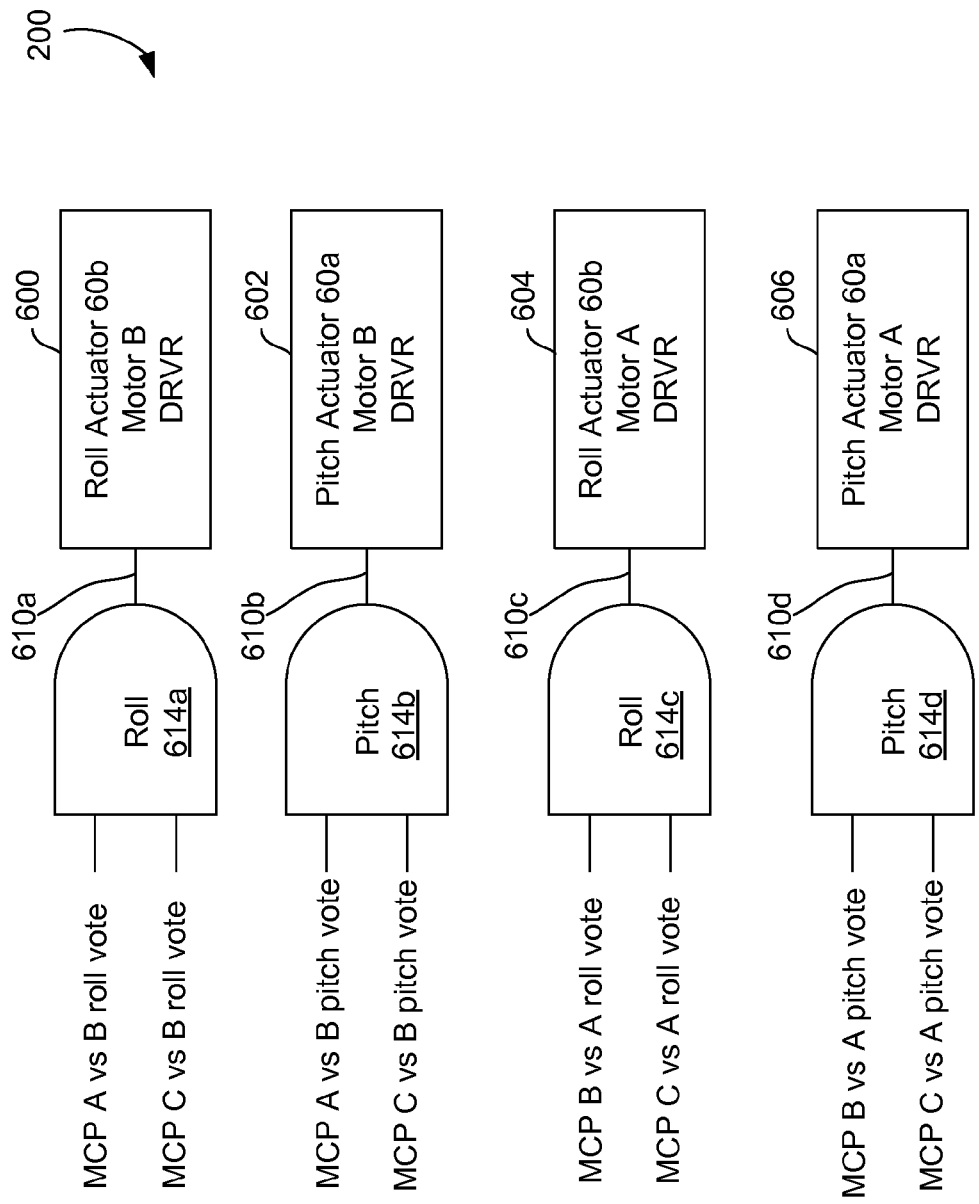
FIG. 6 is a schematic diagram of an embodiment of a voting section that receives votes which are cast by a set of triplex processors.

FIG. 6 is a schematic representation of an embodiment of hardware voting section 200 of FIG. 5. It should be appreciated that one having ordinary skill in the art may readily implement a software version based on the hardware configuration that is shown. Main unit electronics 66 (FIGS. 2 and 5) includes an individual driver for Motor A and Motor B of each actuator. In particular, a first driver 600 drives Motor B of roll actuator 60b, a second driver 602 drives Motor B of pitch actuator 60a, a third motor driver 604 drives Motor A of roll actuator 60b and a fourth motor driver 606 drives Motor A of pitch actuator 60a. In this regard, each MCP generates separate commands for pitch and roll that are targeted for pitch and roll actuators 60a and 60b, respectively. For example, MCP A delivers pitch actuations to Motor A of actuator 60a and delivers roll actuations to Motor A of actuator 60b. For purposes of the present description, a logic high signal on disable inputs 610 of each driver (individually designated as 610a-610d) will result in disabling that driver, although any suitable logic scheme can be employed. During normal operation, these drivers operate in a manner that will be familiar to those of ordinary skill in the art with respect to driving the armature coils of brushless DC motors in timed coordination. As will be seen, the status for a given motor is determined independently, based on independent pitch and roll vote indications that are cast by the MCPs that do not control the given motor.

Still referring to FIG. 6, each motor driver disable input 610a-610d is electrically connected to a respective output of one of a set of two-input AND gates 614a-614d. Further, each AND gate 614 receives vote indications from the two MCPs that are not associated with the particular motor driver to which each AND gate is connected. For example, AND gate 614a, which can disable driver 600 for Motor B of roll actuator 60b, receives a first roll vote indication from MCP A that is designated as "MCP A vs. B roll vote" to indicate that the vote is cast by MCP A for or against the command generated by MCP B. Similarly, AND gate 614a receives a second roll vote indication from MCP C that is designated as "MCP C vs. B roll vote" to indicate that the vote is cast by MCP C for or against the command generated by MCP B. Thus, roll votes cast by MCP A and MCP C are individual indications by these two MCPs as to whether a current roll stick movement command being generated by each of MCP A and MCP C agrees or disagrees with the current roll stick movement command being generated by MCP B. In the present implementation, a vote by MCP A or MCP C against or in disagreement with the MCP B roll command is characterized as a high logic level. If only one of MCP A or MCP C casts a roll control vote against MCP B, only one input of AND gate 614a is logic high such that the output of AND gate 614a remains at logic low, which does not disable driver 600 to maintain Motor B of actuator 60b in a normal operational status. On the other hand, if both MCP A and MCP C cast a vote against roll control by MCP B, AND gate 614a will output a logic high level that disables motor driver 600 such that Motor B of roll actuator 60b is deactivated. Control of each of the remaining three motors is implemented in a manner that is consistent with the foregoing descriptions, as illustrated by FIG. 6.

Attention is now directed to further details with respect to the inner and outer control loops of the present disclosure. In an embodiment, the inner loop can be configured for providing control of one or more selected orientation parameters of the helicopter such as, for example, attitude hold including a given level of redundancy and/or software certification applied to the inner loop. The outer, autopilot loop can be configured for providing at least one navigation function with respect to the flight of the aircraft including a different level of redundancy and/or software certification as compared to the inner loop. The redundancy and/or certification level applied to the inner loop can be greater than the redundancy and/or certification level applied to the outer loop.

Figure 7:
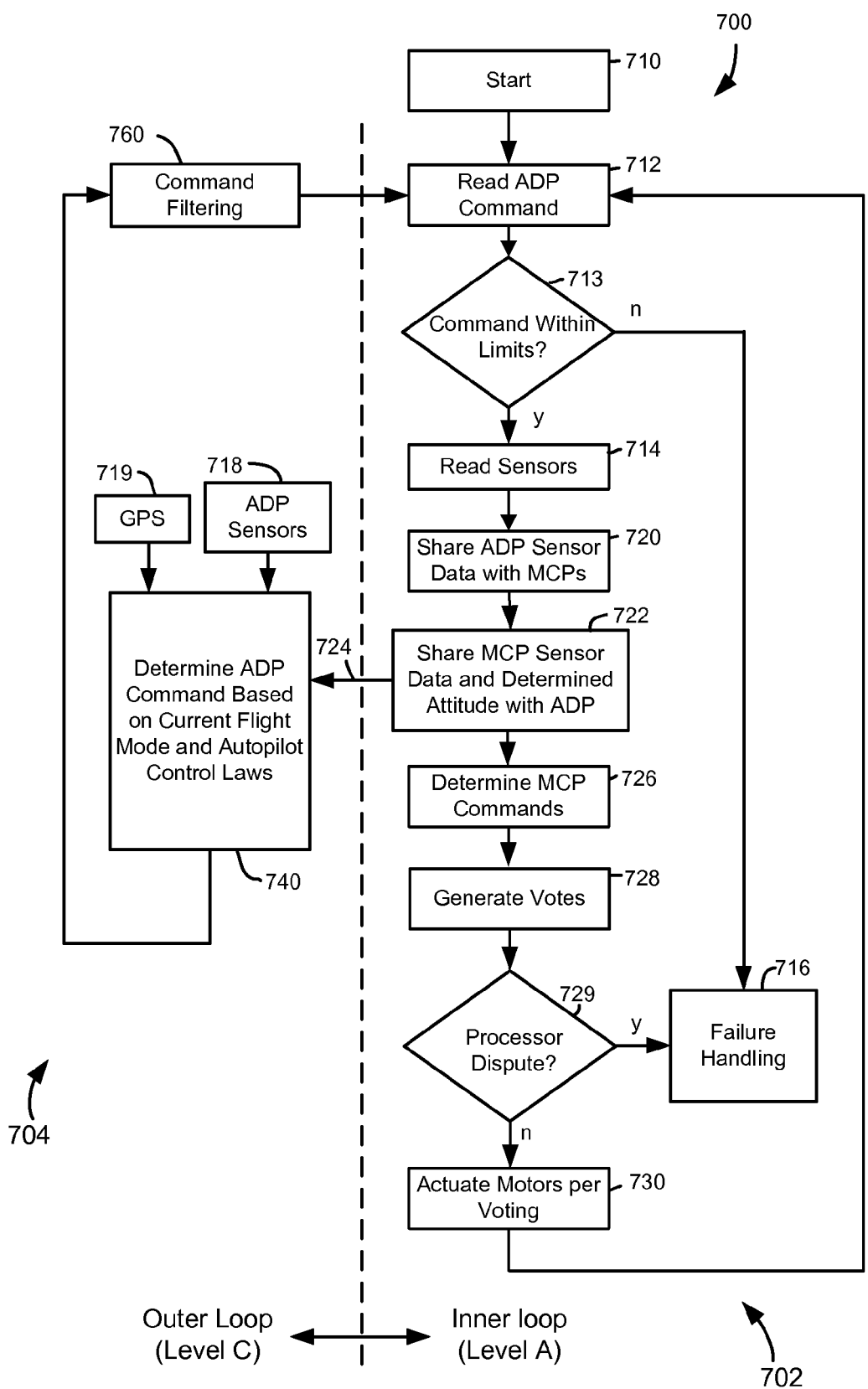
FIG. 7 is a flow diagram that illustrates an embodiment of a method for the operation of an inner control loop and an outer control loop of the system of the present disclosure.

FIG. 7 is a flow diagram, generally indicated by the reference number 700, which illustrates an embodiment of a method for operating an inner loop 702 and an outer loop 704, as well as interaction between these loops. The method starts at 710 and proceeds to 712 which reads an ADP command that is passed from the outer loop, as will be further described. For the moment, it is sufficient to note that an ADP command is obtained for each iteration though the inner loop. An ADP command filtering decision is made at 713 as to whether the ADP command is within acceptable limits, for example, as described above. If the command is acceptable, operation proceeds to 714. On the other hand, if the command is not acceptable, operation proceeds to failure handling 716 which can initiate the issuance of warnings and/or shut down the autopilot. At 714, each MCP reads the sensors of its sensor suite (FIG. 5) while the ADP reads ADP sensors 718 and GPS 719. At 720, the ADP sensor data is shared with the MCPs. At 722, the MCPs share MCP sensor suite data (FIG. 5) with one another to form an average set of sensor data that is used by each MCP and which is shared with the ADP. Further, the MCPs determine an attitude for the helicopter which is also shared with the ADP as indicated by a connection 724. At 726, each MCP determines actuator motor commands. At 728, voting is performed based on the commands, for example, using the hardware implementation of FIG. 6 or a software equivalent. At 729, the results of voting are compared. In the event that there is a processor dispute, operation transfers to failure handling 716. Any appropriate action can be taken as a failure handling depending on the voting results. For example, if control has been voted out for one motor of a particular actuator, that motor can be deactivated, as discussed above. Appropriate warnings can be issued. If step 730 does not identify a voting dispute, operation proceeds to 730, wherein the motors are actuated based on the voting.

Still referring to FIG. 7, attention is now directed to further details with regard to the operation of outer loop 702. It is noted that inner loop 702 and outer loop 704 execute in parallel in a cooperative manner. In this regard, at 740, the outer loop determines an ADP command that is based on the current flight mode and control laws for the particular rotorcraft in which the autopilot is installed. The control laws and related parameters can be customized on a per rotorcraft basis. The determination is based, at least in part, on rate data from the MCPs as well as an attitude for the helicopter that is generated by step 722 of the inner loop, taken in conjunction with data from ADP sensors 718 and GPS 719. At 760, command filtering is applied which serves to limit ADP commands for subsequent use by the inner loop. The current ADP command, subject to filtering, is the read by step 712. In this regard, it should be appreciated that step 726 applies command limiting, as described above.

Figure 8:
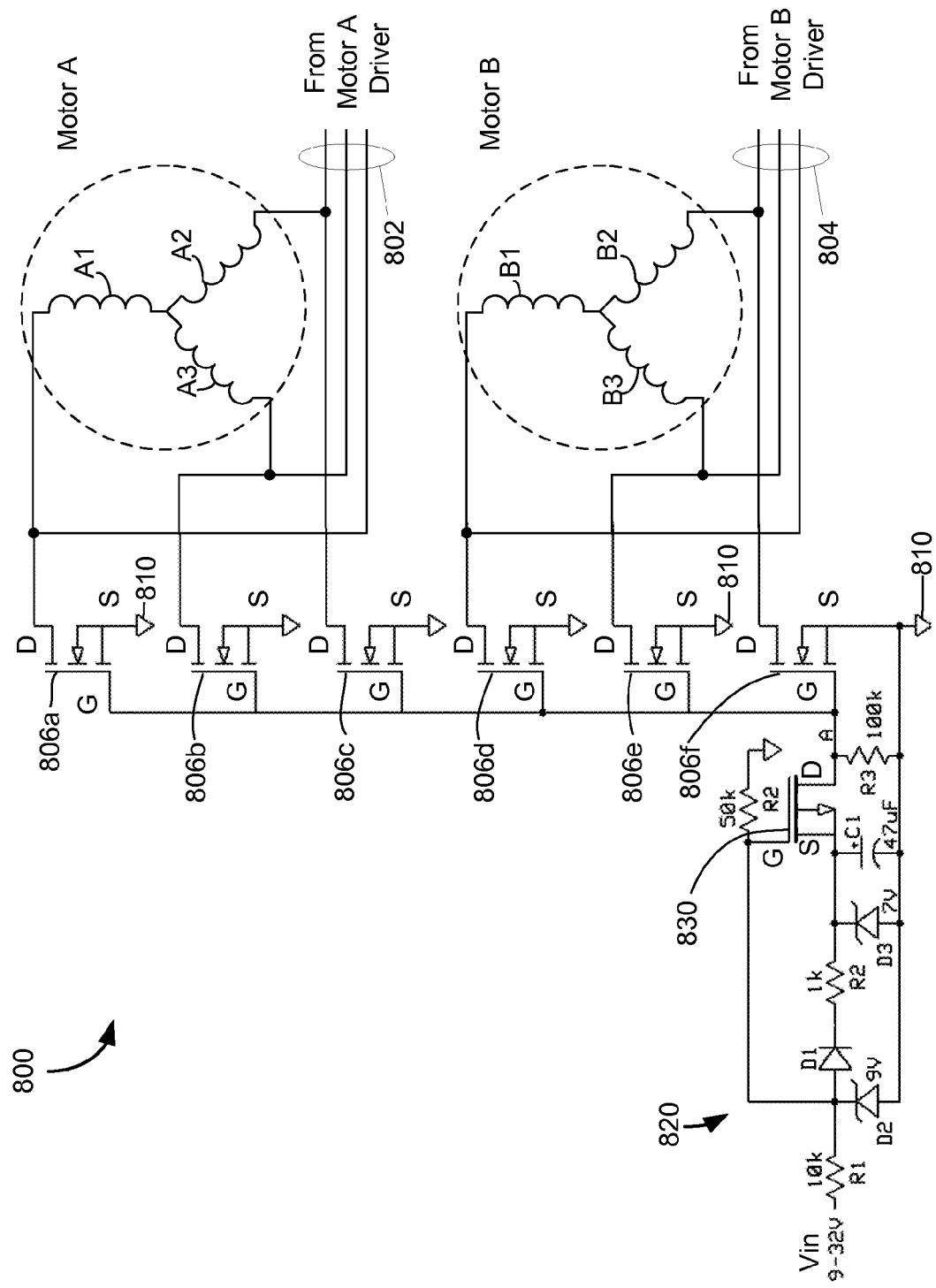
FIG. 8 is a schematic diagram of an embodiment of a dynamic braking system that can form part of the system of the present disclosure.

FIG. 8 is a schematic diagram of an embodiment of a dynamic braking system, generally indicated by the reference number 800, that can be used, for example, with actuator 60 of FIG. 3. As described above, each motor can include a Y-connected stator. In particular, each motor includes three stator coils, designated as A1-A3 for Motor A and as B1-B3 for Motor B. For purposes of the present discussion, it should be noted that the motors are selected for characteristically exhibiting a resistance to rotation of the drive shaft of the motor in response to shorting or grounding the drive coils. Sets of motor driver lines 802 and 804 are connected to appropriate motor drivers, for example, as seen in FIG. 6. Each stator coil is also electrically connected to the drain terminal D of one of a group of six n-channel enhancement mode MOSFETs, individually designated as 806a-f and which can be referred to collectively as MOSFETs 806. The source terminal S of each of these transistors is connected to a ground 810. Accordingly, a positive voltage on a gate terminal G of these MOSFETs turns on each MOSFET such that the drain to source channel is essentially shorted, so as to function as a switch to connect or short the associated stator coil to ground. A drive circuit 820 receives input power from the helicopter, which is designated as $V_{in}$, and can comprise battery power from the helicopter. For purposes of drive circuit 820, the input power for proper operation can range from 9-32 volts DC. When power is present, during normal operation of the helicopter, a zener diode D2 regulates to 9 volts which biases the gate terminal of a p channel depletion mode MOSFET 830 to 9 volts. Current flows through a diode D1 and a 1K ohm resistor to another zener diode D3 which biases a source terminal of MOSFET 830 to 7 volts, also charging a capacitor C1 to 7 volts. Thus, $V_{GS}$ of MOSFET 830 is 2 volts DC such that the transistor is biased into an off state. Since MOSFET 830 is off, the drain terminal of this MOSFET is at zero volts which biases the gate of each of MOSFETs 806 to zero volts such that each of these transistors is also off.

Still referring to FIG. 8, responsive to a power failure in which Vin goes to zero volts, the gate voltage of MOSFET 830 drops to zero volts which turns the transistor on. Once MOSFET 830 is on, it provides a discharge path for capacitor C1 to a 100K ohm resistor R3. This discharge current results in the application of a positive gate voltage to each of MOSFETs 806 such that these transistors turn on, thereby connecting the stator coils of motors A and B to ground as capacitor C1 discharges through R3. Accordingly, MOSFETs 806 will remain on based on an RC time constant that is determined primarily by capacitor C1 and resistor R3. In the present example, the time constant is approximately 4.7 seconds. In practice, MOSFETs 806 will remain on for about 4 seconds. While this time period can be varied through the selection of component values, it should be selected to provide for a period of time that is sufficient for the pilot to take over manual control from the autopilot. Even during the time period during which braking is applied, the pilot is able to take over and maintain control of the helicopter due to the presence of force limited links 300a and 300b, as described above and shown in FIGS. 1 and 2. One of ordinary skill in the art will recognize that the circuit of FIG. 8 can readily be modified and adapted in view of a particular installation.

Referring to FIG. 5 in conjunction with FIG. 8, it should be appreciated that two instantiations of the circuit of FIG. 8 are utilized. That is, one instance of the circuit of FIG. 8 is connected to the motors of each of the roll actuator and the pitch actuator. By temporarily shorting the motor coils to ground based on the time constant described above, resistance to rotation of the output shaft of each motor is produced. The degree of resistance is amplified by the gear arrangement of the actuator such that significant force is needed to move the stick from the position at which the power failure occurred. Empirical results have demonstrated that the stick will not flop over as a result of a power failure while allowing ample time for the pilot to take over control of the helicopter from the autopilot. It should be appreciated that dynamic braking, as taught herein, can be used with any motor that exhibits resistance in response to shorting at least selected drive coils.

Figure 9:
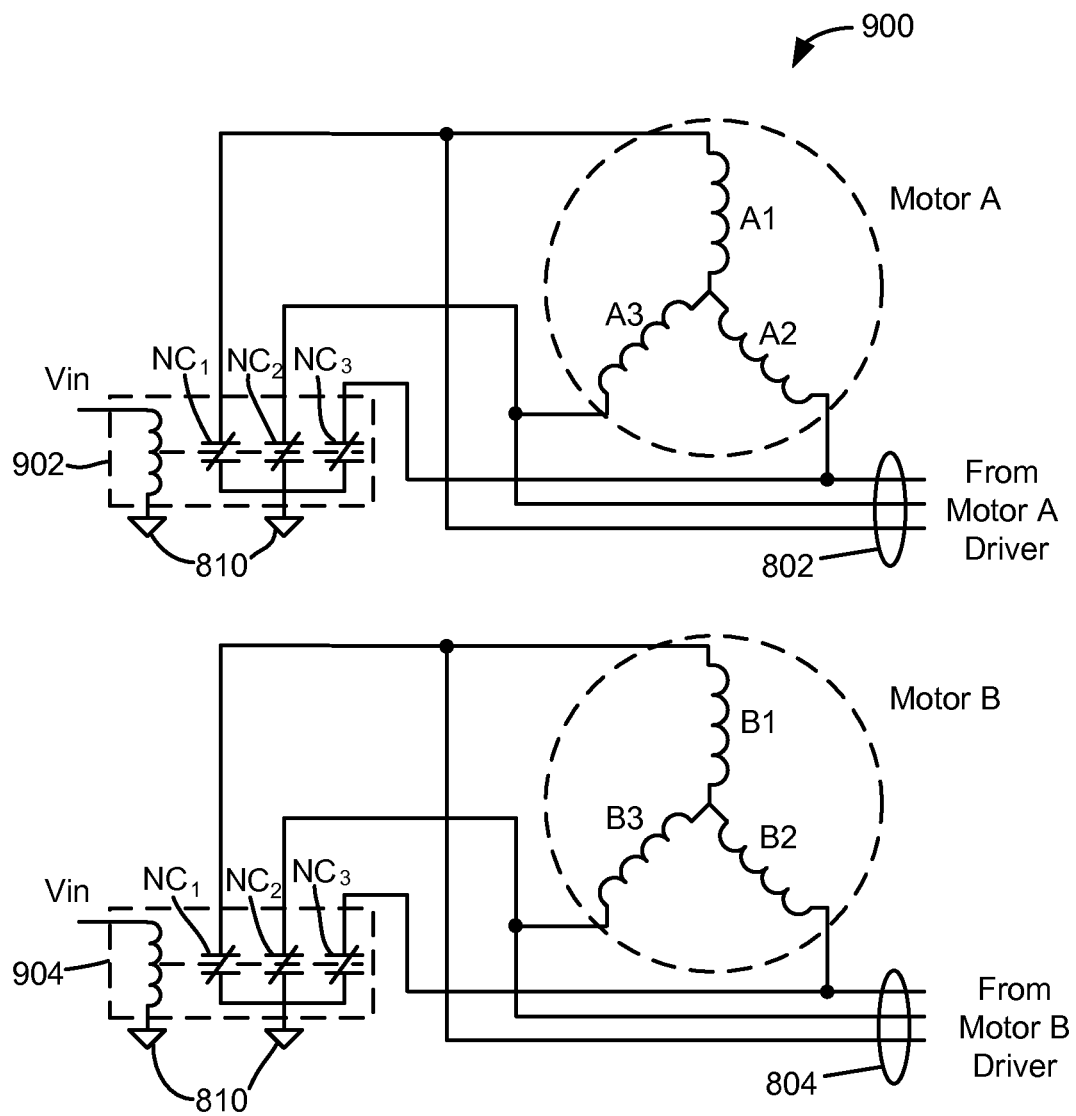
FIG. 9 is a schematic diagram of another embodiment of a dynamic braking system that can form part of the system of the present disclosure.

FIG. 9 illustrates another embodiment of a dynamic braking system, generally indicated by the reference number 900, that can be used, for example, with actuator 60 of FIG. 3. In this embodiment, each motor winding is connected to one terminal of a normally closed contact, individually designated as $NC_1$, $NC_2$ and $NC_3$. The opposite terminal of each NC contact is connected to ground 810. Each of a first relay 902 and a second relay 904 includes a relay coil that is driven by Vin. While the present example illustrates the use of a 3 pole, single throw relay (having only normally closed contacts) in association with each motor, it should be appreciated that any suitable type of relay can be used. During normal operation, Vin is applied to each relay coil such that the normally closed contacts are in an open condition. If Vin is lost, however, the normally closed contacts close to connect each stator coil to ground thereby applying dynamic braking, as described above. Since the motors remain in a braked condition responsive to power failure, the pilot is able to take over and operate the helicopter due to the presence of force limited links 300a and 300b, as described above and shown in FIGS. 1 and 2.

Referring again to FIG. 5, it should be appreciated that the MCPs do not require an input from an airspeed sensor such as, for example, a pitot tube. In this regard, Applicant has discovered a heretofore unseen approach for determining airspeed based on the configuration of the system that has been described above and as will be described immediately hereinafter.

Figure 10:
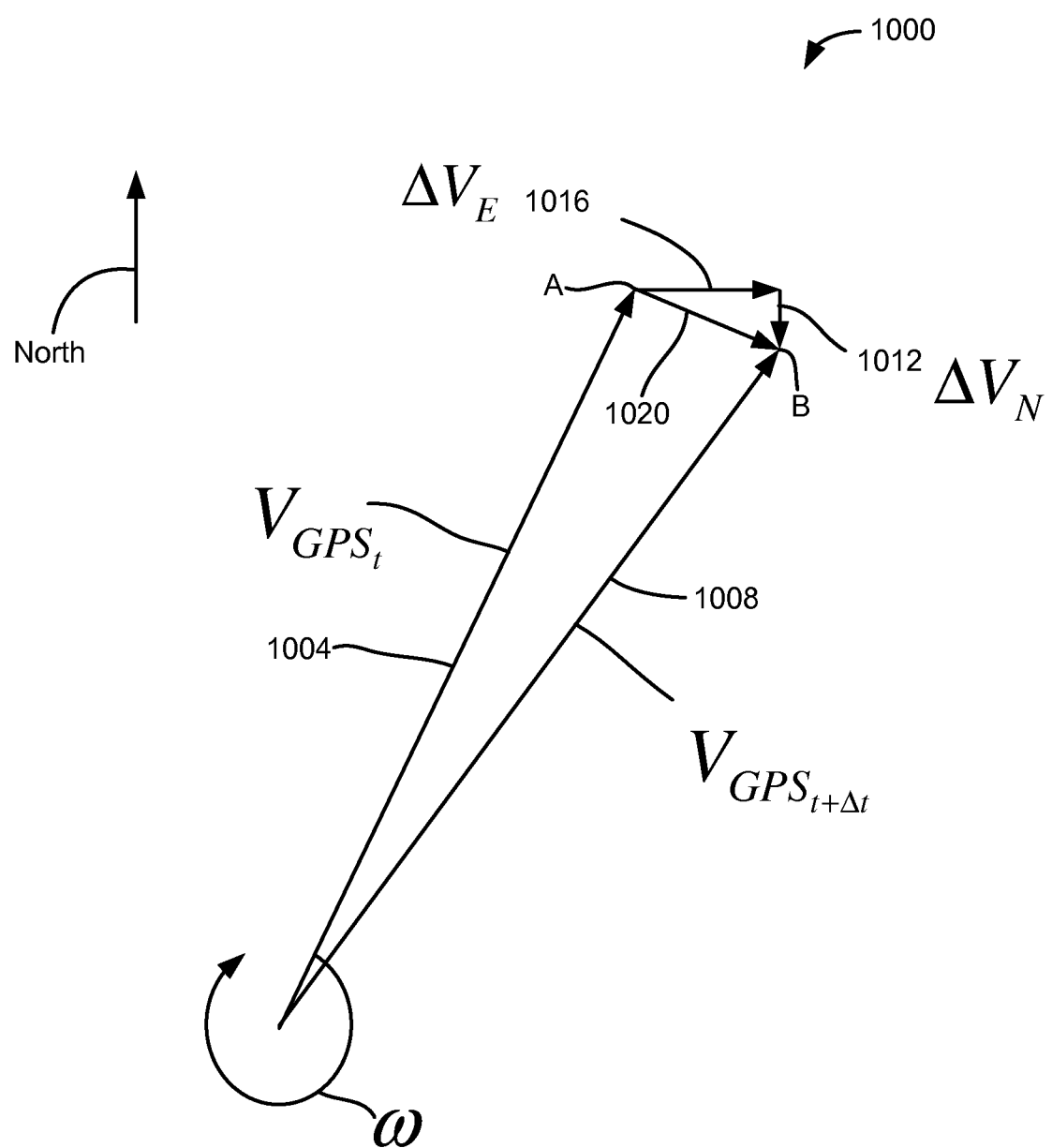
FIG. 10 is a vector diagram illustrating a ground speed vector for each one of two different positions of an aircraft.

Attention is now directed to FIG. 10 which is a vector diagram, generally indicated by the reference number 1000, having a North compass direction oriented toward the top of the view. A first groundspeed vector 1004 ($V_{GPS_t}$) that is measured at a first time is shown in conjunction with a second groundspeed vector 1008 ($V_{GPS_{t+\Delta t}}$) that is taken at a second time, $\Delta t$, after the first groundspeed vector. As shown, a ground track is associated with these vectors. Based on the difference in track orientation between vectors 1004 and 1008, it should be appreciated that the aircraft is engaged in a turn. Thus, a rate of turn ω is associated with this turn and is indicated by a circular arc. Points A and B terminate the respective first and second groundspeed vectors. The difference between these two groundspeed vectors, between points A and B, can be reduced to a northing component 1012 and an easting component 1016. The northing component can be mathematically designated as $\Delta V_N$ while the easting component can be mathematically designated as $\Delta V_E$ as shown in FIG. 10. Applicant recognizes that dividing these incremental components by $\Delta t$, the time increment between the times at which the vectors are measured, can determine a centripetal acceleration 1020, as indicated by an arrow. If ascent or descent of the aircraft is involved, the incremental change vector can be three-dimensional. In most cases, however, the vertical component of movement is much smaller than the in-plane components shown in FIG. 1, such that the vertical component can be ignored, although this is not required. Thus, the magnitude of centripetal acceleration vector, α, can be expressed as:

$$|\alpha| = \sqrt{\left(\frac{\Delta V_N}{\Delta t}\right)^2 + \left(\frac{\Delta V_E}{\Delta t}\right)^2} \qquad (1)$$

The magnitude of the centripetal acceleration, like other acceleration magnitudes, is invariant of the inertial system that it is measured from. Therefore, if the centripetal acceleration is measured in an Earth-fixed reference system, as is case with GPS measurements, the magnitude is the same as that which would be obtained from a system moving with the prevailing wind that carries an aircraft along.

With the centripetal acceleration vector denoted as α:

$$\alpha = \omega \times V \qquad (2)$$

where rotation speed vector ω is shown in FIG. 10 and is measured in the selected reference system along with a velocity vector, V. If it is assumed that rotation vector, ω, is normal to velocity vector, V, which is typically a reasonably accurate, if not better, assumption for aircraft flight, then an expression can be framed in terms of the magnitudes of the vectors according to:

$$V = \alpha/\omega \qquad (3)$$

If ω is measured in the Earth-referenced system, for example, based on GPS data, then V is the groundspeed (GPS speed). On the other hand, if ω is measured in a system that is moving with the aircraft system as rate of heading change, then V is the airspeed. Based on this recognition, two simulations were performed, as described immediately hereinafter.

In a first simulation, an aircraft was flying on a north track (Earth system) at an airspeed of 80 knots. A 30 knot wind is assumed coming from the north-east. The aircraft started a constant rate roll into a standard rate turn (3 degrees/sec.). The roll rate was such that it took two seconds to enter the bank angle to produce this standard rate turn. The track turn rate was measured in the Earth-fixed coordinate system and not constant due to the wind. The aircraft then rolled out at the same rate as it rolled into the standard rate turn. V was determined from Equation 3 using Earth-based measurements for centripetal acceleration and track turn rate and found to be equal, at least to a reasonable approximation, to the groundspeed as produced by a GPS receiver, as expected.

In a second simulation, again using the same model including the constant heading turning rate, V was again determined. This time, however, an aircraft-fixed coordinate system was used with the heading taken from a gyro on-board the aircraft to determine turn rate w in Equation 3. The determined value for speed was an aircraft frame of reference airspeed, that was at least approximately equal to the actual, input airspeed of the aircraft, as expected. Accordingly, Applicant has discovered that by using only GPS data and a rate gyro, airspeed can be determined during turns such that an airspeed measuring system is not necessarily required in an embodiment of an autopilot. In another embodiment, compensation for a failed airspeed detection system can be provided based on the approach that has been brought to light herein. For example, upon detection of a failed or malfunctioning airspeed detector, a partial turn can be performed by an autopilot or pilot to obtain airspeed based on the described approach. In this regard, it should be appreciated that airspeed data can be important with respect to preventing an aircraft from overspeeding, for example, when flying in an autopilot controlled constant speed mode, that might cause structural failure. That is, if an aircraft turns from a downwind direction into the wind and attempts to maintain groundspeed at a constant groundspeed, the now opposing wind can result in exceeding the airspeed design limits of the aircraft to maintain a constant groundspeed. For example, consider an aircraft flying at 80 knots with a direct tailwind of 30 knots. The GPS groundspeed being maintained is 110 knots. Now, if the aircraft performs a 180 degree turn while maintaining groundspeed, the aircraft will roll out of the turn with a 110 knot groundspeed into a 30 knot head wind. This means the aircraft will be flying at an airspeed of 140 knots, which could be well beyond the allowable airspeed of the aircraft.

For fixed wing aircraft, stall is an important consideration. Embodiments of the method of the present disclosure can provide a back-up to an airspeed indicator in the instance of a malfunction due to ice covering the pitot tube of the airspeed sensor or if insects or debris block the pitot tube. Applicant recognizes that both fixed wing and rotary wing aircraft normally include the necessary panel-installed instruments and/or sensors for purposes of implementing the airspeed determination method of the present disclosure. For example, the heading rate can be provided by measuring the change in heading indicated by a heading gyro. In such an embodiment, an electrical output from the heading gyro is interfaced to the new airspeed system. In this regard, such heading gyros, with an electrical output, are common in the aircraft market.

In view of the foregoing, systems and methods based on the recognitions that have been brought to light herein may generally be referred to hereinafter as CAVS (Centripetal Acceleration Velocity System). A CAVS autopilot design, according to the recognitions herein, can hold the GPS groundspeed until the start of a turn, which is readily detectable, and then switch to holding a centripetal force based airspeed until the end of the turn. At the end of the turn, as detected, the autopilot can hold a new groundspeed associated with the groundspeed that is detected as the aircraft rolled out of the turn. In the above example, the aircraft would then maintain a 50 knot groundspeed with an 80 knot airspeed.

Figure 11:
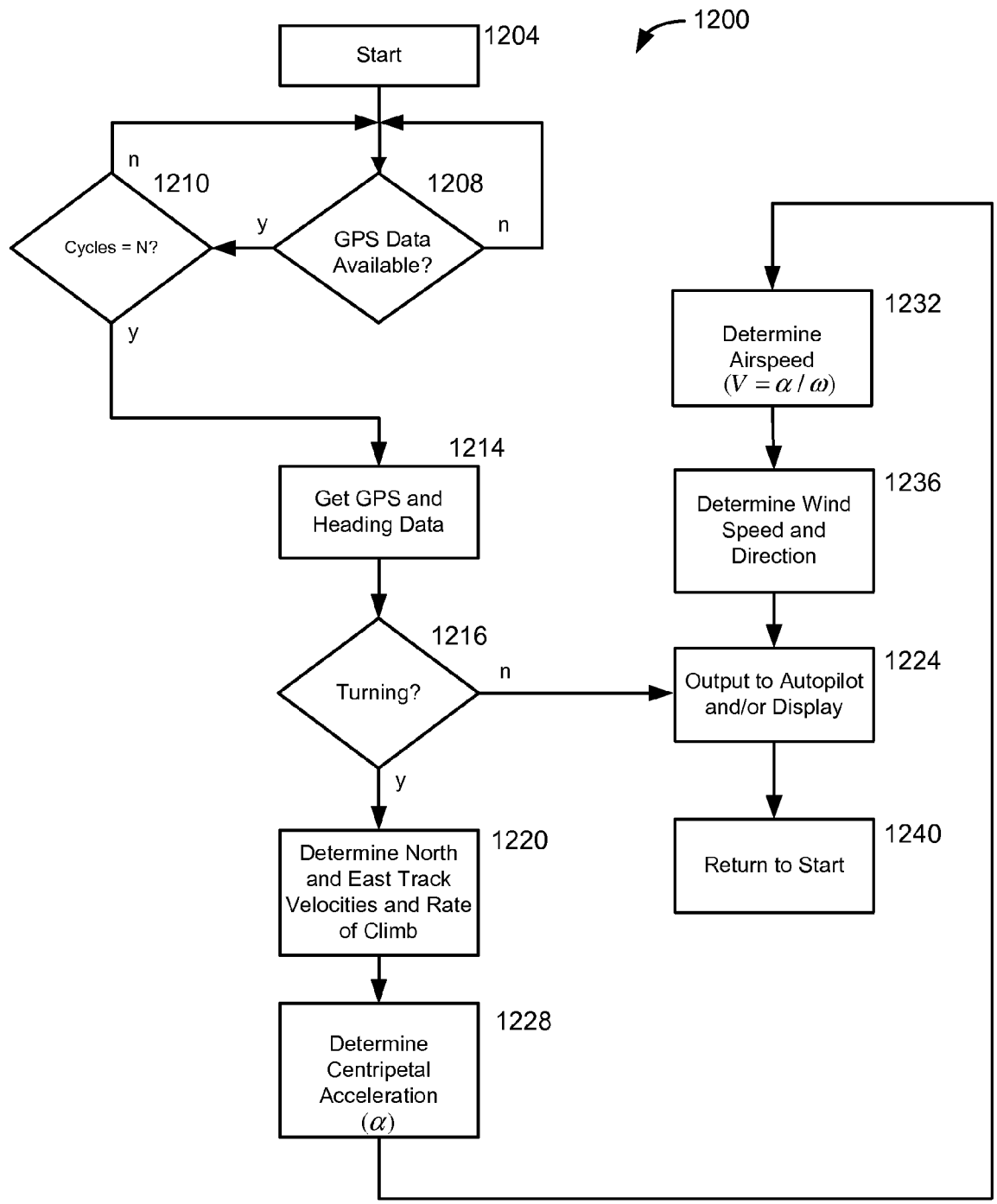
FIG. 11 is a flow diagram illustrating an embodiment of a method for executing centripetal acceleration velocity system determinations of airspeed.

Attention is now directed to FIG. 11 which is a flow diagram that illustrates an embodiment of a CAVS method, generally indicated by the reference number 1200, for determining airspeed based on centripetal force in a manner that is consistent with the foregoing descriptions. Initially, it is noted that that the only input requirements for the system are: (1) heading from a heading gyro, (2) altitude, (3) track angle and (4) groundspeed, wherein the latter three items can be provided from a GPS receiver. In this regard, some GPS units supply the north and east components of the groundspeed. For those units, the track angle on the ground can be determined from the two groundspeed components at a given position; conversely, the two speed components can be determined from the track angle at the given position when only the magnitude of the groundspeed is provided. The altitude can be used to determine the vertical velocity (rate of climb) such as between points A and B of FIG. 10, which would only have a noticeable impact if the vertical velocity acceleration became a significant percentage of the groundspeed-heading change acceleration such as, for example, greater than 10 percent. The vertical component of acceleration can be measured by a rate gyro or multiple axis rate gyros, resolved into the proper component of rate. If the vertical velocity acceleration (i.e., pitch rate) becomes significant, the acceleration vector can be taken as three-dimensional. The method begins at 1204 and moves to 1208. This step monitors for the availability of GPS data and captures new data whenever such data is available. The data, as is the case with any data described in conjunction with the embodiments herein, can be directed to a rolling buffer, for example, in ADPU 28 (FIG. 5) which can store data corresponding to a time interval that extends from present time and back in time by a selected number of seconds. Of course, such a rolling buffer and/or other memory can be provided at any suitable location within the system. The time interval can be selected based on the particular update rate and data resolution that is in use. For a typical light aircraft having data resolutions of 1 degree for heading and 1 knot for speed (hereinafter, standard light aircraft resolution), a buffer length of 4 seconds can be used, although any suitable value can be used. Having captured a packet of GPS data at 1208, operation can move to 1210 which imposes a packet selection interval. This selection interval can be used for purposes of customizing the time difference between GPS packets that are fed as inputs to the process in view of the data resolution of a given GPS that is in use. For example, Applicant has demonstrated useful results for standard light aircraft resolution when input GPS packets are spaced apart in time by three seconds. If the given GPS provides a packet every second, step 1210 will result in acceptance of every third GPS packet, skipping two intermediate packets. In FIG. 5, packets $P_1$, $P_4$, $P_7$ and so on, are accepted, while intervening packets are not used. For packets that are not accepted, operation returns to 1208. Of course, if the GPS provides packet updates every three seconds, every packet is accepted and step 1210 is not needed. In the instance of a GPS providing 5 updates per second, 14 update packets can be skipped such that every $15^{th}$ packet is accepted. Accordingly, this customization provides for acceptable or better accuracy in determinations made by the process since the change in track angle of the aircraft over the selection interval that is chosen can be large in comparison to the rounding errors that are present in the GPS data. For example, in a standard turn of 3 degrees per second, the change in track angle is 9 degrees which is large in comparison to a one-half degree rounding error. Stated in another way, the difference in track angle should be sufficiently large such that rounding induced errors are small compared to the track angle change.

Once a GPS packet has been accepted, operation moves to 1214 and can separately store the GPS data for future reference in addition to its availability via a rolling buffer. At least two GPS packets are needed, of course, for purposes of performing CAVS determinations, however, one or more previous GPS packets can be accessed, for example, from the rolling buffer. In an embodiment, whenever a packet is accepted, heading data can be collected, for example, based on a heading gyro in ADPU 28 of FIG. 5 and stored with reference to corresponding GPS data. Using heading, the method only requires determining the difference between the current heading and the heading read at the last time interval/packet divided by the time difference $\Delta t$ to produce a heading rate. This represents the average rate of change in heading during the time interval. In another embodiment, a heading rate sensor can be monitored with a number of heading rates acquired over the interval and averaged to produce an average rate over the interval which should be equal to the difference in the heading over the entire time interval.

At step 1216, the track angle data can be tested to insure that the aircraft is actually in a turn. It should be appreciated that the decision to accept a particular packet as being representative of a sufficient amount of turning can be configured according to a wide range of suitable embodiments such as, for example, based on heading change. Step 1216 can monitor turns for purposes of initiation of the CAVS airspeed determination method when a sufficient amount of turning is detected, continuing the method when ongoing turning is detected and/or terminating the method when an insufficient amount of turning is detected. In an embodiment, the decision can be made based on the change in track (angle over the ground) from one packet to the next. The threshold for this latter decision, for example, can be 9 degrees, although any suitable value can be used. In another embodiment, the packet-to-packet change in track can be monitored for more than two consecutive packets. For example, if two consecutive packets exhibit a 2 or 3 degree difference, the first packet can be held for another two or three packets and, if at any time during that process, a 9 degree difference is detected then operation can proceed to step 1220. When a turn is detected, an autopilot can switch from maintaining GPS-based groundspeed to holding CAVS airspeed. If an insufficient amount of track change is detected, operation can route to step 1224 which can output an exit groundspeed value for display and/or autopilot use based, for example, on whether a turn was already in progress. Further, the autopilot mode can switch from holding CAVS determined airspeed based on centripetal force to holding groundspeed to a value that corresponds to the exit groundspeed value at the end of the turn. Speed can then be displayed based on GPS groundspeed. If the track angle data remains indicative of a turn, operation can proceed to 1220 which determines the northing and easting components $\Delta V_N$ and $\Delta V_E$ based on the associated headings and in a manner that is consistent with FIG. 10, for example, by determining the differences between the northing and easting groundspeeds for the current time period versus the prior time period. Step 1220 can also compare rate of climb to determine if a vector analysis including a vertical dimension is necessary. At 1228, the magnitude of centripetal acceleration $\alpha$ can be determined, according to equation (2) by squaring the northing and easting components, dividing each component by $\Delta t$, adding the resulting values together and then taking the square root of the sum. At 1232, the magnitude of the centripetal acceleration is divided by the heading rate value $\omega$, in accordance with equation 3, to produce the airspeed V.

At 1236, the known information including airspeed can be used to determine the northing and easting airspeed velocities, the wind speed and wind direction. In this regard the GPS-based groundspeed and track are known as well as the airspeed and aircraft-based heading. Based on ground-based speed and ground track, northing and easting ground velocity components can be determined. Similarly, northing and easting aircraft based velocities can be determined based on airspeed and aircraft-based heading. Subtracting the aircraft-based velocity components from the corresponding track velocity components yields the wind velocity components. A northing aircraft velocity $V_{AN}$ and an easting aircraft velocity $V_{AE}$ can be expressed as:

$$V_{AN} = V \cos H \quad (4)$$

$$V_{AE} = V \sin H \quad (5)$$

Where heading H is available from any suitable source such as, for example, from the MCPs. The northing wind speed $W_N$ and the easting wind speed $W_E$ can be determined using:

$$W_N = V_{GN} - V_{AN} \quad (6)$$

$$W_E = V_{GE} - V_{AE} \quad (7)$$

Where $V_{GN}$ and $V_{GE}$ can be the GPS-based northing and easting velocity components, respectively for the velocity vector at the current location such as represented by vector 1008 of FIG. 10. The magnitude of the wind is given as:

$$|W| = \sqrt{W_N^2 + W_E^2} \quad (8)$$

The wind direction is given by:

$$W_L = \tan^{-1}\left(\frac{W_N}{W_E}\right) \quad (9)$$

The wind speed quadrant can be determined based on the mathematical signs of the northing and easting wind velocity components. The wind direction is the wind velocity vector rotated by 180 degrees since the wind direction is specified as the direction from which the wind is coming.

Subsequent to step 1236, the method proceeds to 1224 at which the results can be displayed directly and/or used for other equipment such as an autopilot. Using the described centripetal acceleration based method, it is not necessary to have an airspeed indicator in order to hold airspeed in a turn. When not turning, the groundspeed such as, for example, GPS speed can be used to hold speed. In a turn, an autopilot can hold airspeed using the above procedure so that excessive airspeed is not be produced as might occur when holding groundspeed in a turn from a strong tailwind into a strong headwind. Following 1224, the method can proceed to step 1240 which can return the method to start 1204 or end the method. While excessive airspeed has been used as an example, it should be appreciated that too low an airspeed can also be a concern. Turning from a head wind into a tail wind can create this condition. Low airspeed can place the aircraft on the backside of the power curve such that more power is required to go slower. If the altitude is being held by an autopilot via controlling the pitch angle, then the process will become unstable. For example, if the aircraft loses altitude, the autopilot will pitch the aircraft upward in an attempt to regain the altitude. This will slow the aircraft down which will require even more power to hold altitude thereby causing the aircraft to descend even faster. For a fixed wing aircraft, this can induce a stall.

Figure 12:
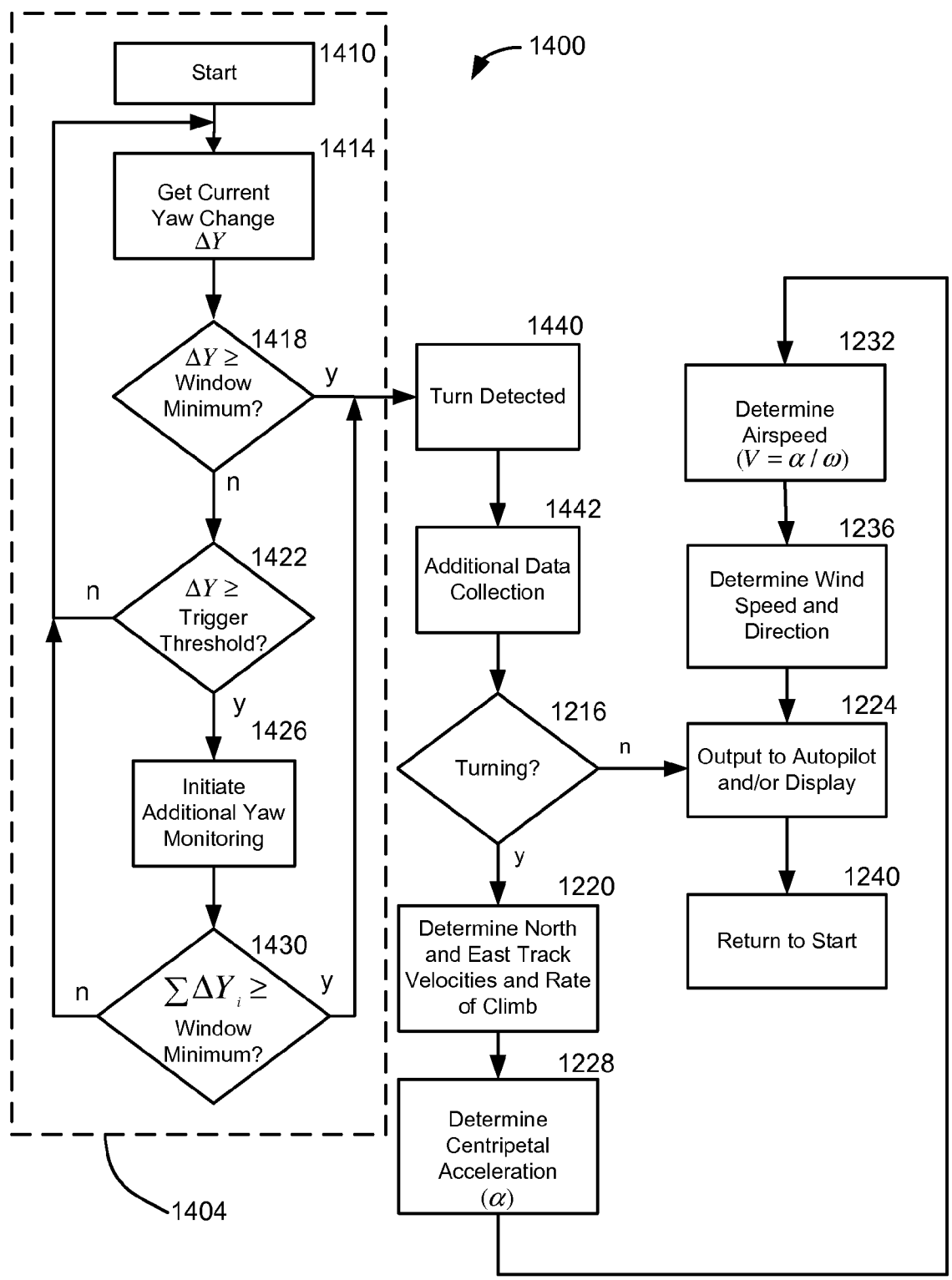
FIG. 12 is another flow diagram for executing centripetal acceleration velocity system determinations of airspeed including a turn detection procedure.

Referring to FIG. 12, a flow diagram illustrates another embodiment of a CAVS based method, generally indicated by the reference number 1400, for determining airspeed based on centripetal acceleration in a manner that is consistent with the descriptions relating to embodiment 1200 beginning at step 1216. Accordingly, descriptions of like steps have not been repeated for purposes of brevity. Embodiment 1400, however, includes a turn detection procedure 1404 that is shown within a dashed rectangle and which precedes step 1216. The method begins at start 1410 and moves to step 1414 which monitors changes in aircraft yaw as represented by a value $\Delta Y$. This latter value, in an embodiment, can be based on the change in GPS track angle on the ground in a manner that is consistent with the descriptions above. For example, $\Delta Y$, can be determined as rapidly as packets are available from the particular GPS that is in use. It should be appreciated that two or more GPS packets are needed in order to determine $\Delta Y$. Of course, any suitable number of GPS packets and related data can be available from a rolling buffer, for example, located in the ADP and/or any other suitable location. In some embodiments, at least some GPS packets can be skipped on the basis of a relatively rapid GPS packet update rate. For example, for a five packet per second GPS, at least some of the packets can be skipped insofar as their contributing to the determination of $\Delta Y$, although this is not required. It should be appreciated that the number of updates that is skipped can be customized, for example, based on the track angle resolution of the GPS since the effects of rounding errors decrease in proportion to increasing track angle resolution.

Continuing with the description of step 1414, the value of $\Delta Y$, in some embodiments, can be based on monitoring aircraft heading H as determined by the MCPs. This determination, as described above, can be based at least on MCP sensor data, GPS data and magnetometer data from the ADP. It should be appreciated that the value of $\Delta Y$, when determined in this manner, can be updated very rapidly in what is, at least from a practical standpoint, at least approximately on a real time basis. For example, $\Delta Y$ can be determined as rapidly as the MCP updates are available or at least some of the updates can be skipped, for example, on the basis of the angular resolution that is provided. In an embodiment, the rate for periodic acceptance of MCP updates can be determined based on the GPS packet update rate. For example, $\Delta Y$ can be updated at one second intervals when the GPS packet update rate is one second. It should be appreciated that practical embodiments can use any suitable interval for determining $\Delta Y$ irrespective of whether the value is based on heading H or GPS track angle. Moreover, heading based determinations of $\Delta Y$, like GPS based determinations can be available via a rolling buffer and/or other suitable memory. In still another embodiment, the value of $\Delta Y$ can essentially correspond to the output of a rate sensor which indicates a heading rate of change. At 1418, the value of $\Delta Y$ is compared to a window minimum value (WMV). The latter will be described in further detail at an appropriate point hereinafter. For the moment, it is sufficient to note that this WMV for $\Delta Y$ represents what would most likely be considered as a relatively steep and/or rapid turn, for example, as compared to a standard rate turn such as a 3 degree per second turn. If $\Delta Y$ is less than the WMV, operation proceeds to 1422 which now compares $\Delta Y$ to a trigger threshold value that is indicative of a turn. The trigger threshold value can be based, for example, on a standard rate turn such as 3 degrees per second and is less than the WMV that is used by step 1418. Useful embodiments can use a value in a range from 1 degree to 3 degrees per second. A particular embodiment can use 2 degrees per second. Of course, any suitable value can be used based on a standard rate turn for a given aircraft. By way of background, it is noted that, in aviation, a standard rate turn is often defined as 2 minutes for light aircraft and 4 minutes for jet aircraft. When $\Delta Y$ is less than the trigger value, operation returns to step 1414 for an updated value.

On the other hand, when the value of $\Delta Y$ is equal to or exceeds the selected trigger value, a turn may be underway or the aircraft may have experienced, for example, turbulence that induced a momentary change in heading. In this regard, some amount of side-to-side variation or deviation from an average/intended heading is normal, especially under windy conditions. In this regard, step 1422 initiates a determination that is intended to distinguish between an actual turn and momentary heading deviations. Accordingly, when $\Delta Y$ is equal to or exceeds the minimum trigger threshold value, operation proceeds to step 1426 which initiates additional yaw monitoring. In an embodiment, the yaw monitoring can continue in view of the window minimum value, WMV, that was briefly introduced above with respect to step 1418. The WMV can specify a minimum amount of change in yaw angle over a specified period of time. When this amount of change in yaw angle is met or exceeded for the specified period of time, the aircraft can be considered as being engaged in a turn. On the other hand, when the minimum change in yaw angle is not met for the specified period of time, the detected change in yaw orienation can be attributed to random deviations from an intended heading and as not reasonably being indicative of a turn. Thus, step 1426 can collect further updates for the value of $\Delta Y$ over the specified period of time for subsequent comparative purposes. The WMV therefore can comprise a combination of an angular value and the duration of the time period. In this regard, any suitable combination of values can be used; these values can be customized for a given aircraft. In an embodiment, the values can be selected based on a standard rate turn, for example, of 3 degrees per second. As noted above, the time period can be selected on the basis of rounding error that is present in the value of $\Delta Y$. In one embodiment, the minimum angular change can be selected as 8 degrees while the time period can be selected as 4 seconds. Thus, an average rate of turn of 2 degrees per second is implied. A series of yaw values $\Delta Y_i$ can be determined over the specified time period and can be based on either changes in heading H or GPS track angle. In the instance of random deviation from an intended heading, some values will be positive while others are negative such that these random variations cancel one another. Changes that are responsive to an actual turn, on the other hand, will be cumulative in one angular direction. The total change in yaw angle at the end of the time period, as compared to the value at the beginning of the period, can be specified as $\Sigma \Delta Y_i$.

At 1430, the total yaw change is compared to the WMV. If the total yaw change is less than the WMV, it is assumed that a turn is not underway and operation is returned to step 1414. If, on the other hand, the total yaw change is greater than or equal to the WMV, it is assumed that a turn is underway and operation is routed to step 1440. This step, for example, can initiate switching the display of airspeed from GPS-based to CAVS centripetal force based and/or switching the operational mode of an autopilot from a mode that holds speed based on GPS groundspeed data to holding CAVS airspeed.

Of course, it should be understood that the airspeed determinations, going forward from this point in the process, can remain CAVS based until the aircraft is no longer in a turn. At 1442, the method can collect and store additional data such as, for example, correlating GPS groundspeed with airspeed and updates of GPS data. The process described above with regard to FIG. 11 can be re-entered at step 1216 which relies on the additional collected data to initially confirm that a turn remains in progress.

Attention is now returned to the determination that is made by step 1418. If $\Delta Y$ is greater than or equal to the WMV, for example, of 9 degrees, it can be assumed that the aircraft is engaged in a turn such that operation can proceed immediately to step 1440 without the need to invoke steps 1422, 1426 and 1430, as described above. It should be appreciated that in some embodiments which enter step 1440 from either step 1418 or 1430 on the basis of monitoring heading rate, for example, as provided by a rate sensor, the next available GPS packet can be utilized by the CAVS method.

In addition to the benefits of the CAVS centripetal acceleration-based airspeed determination approach described above, Applicant recognizes that a wide range of additional benefits can be provided. For example, because the airspeed and groundspeed of the aircraft are known over a range of heading angles during a turn or partial turn, an autopilot system can determine the wind speed and direction by using data from two or more angular positions during a turn. Navigation and power settings can then be selected to reduce the amount of fuel consumed during a given flight. The described approach is applicable to aircraft that are capable of any airspeed. For relatively fast aircraft, a compressibility (Mach number) correction can be used. Of course, Applicants recognize that a GPS unit itself can readily be configured to display CAVS airspeed during a turn based on the teachings that have been brought to light herein, for example, with the addition of a rate or heading sensor to the GPS or taking advantage of an existing rate or heading sensor in the aircraft's panel. Further, it should be appreciated that any technique that relies on centripetal acceleration as an input can benefit. In the prior art, the centripetal acceleration is generally calculated based on the true airspeed and the Earth's axis based turning rate. The true airspeed, however, is not measured directly. First, a pitot-static pressure is measured, then the outside air pressure and temperature are measured. The latter two measurements are used to calculate the air density which is used to correct indicated airspeed as calculated from the pitot-static pressure measurement which may require other corrections. Applicant submits that a significant number of inaccuracies are introduced by all these measurements whereas the inaccuracies associated with Applicant's technique are more constrained. For example, the accuracy that is generally associated with the GPS measurements can have a measurement accuracy error that is at least as low as 0.025%.

Still another benefit of the described GPS-based centripetal acceleration determination approach as exemplified, for example, by FIG. 10 and associated descriptions relates to slaving of aircraft gyros. When a gyro is used to augment a magnetic compass, the reference for the gyro should be the Earth's gravitational vector, so that a turn represented by the gyro represents a turn in the Earth's axis system. When an aircraft makes a coordinated turn, however, the centripetal acceleration produces an acceleration that adds to the gravitational acceleration in such a way that the total acceleration is towards the floor of the aircraft. Slaving a gyro to this apparent acceleration can be problematic since the gyro will tend to shift to an axis as a reference which is perpendicular to the floor of the aircraft in a turn, if the aircraft executes a turn of sufficiently long time duration. Applicant recognizes that compensation can be provided via the described approach for determining centripetal acceleration. This centripetal acceleration determination can be used to correct the apparent vertical acceleration in a turn and force a gyro to slave to the correct Earth axis as a reference. This technique can be particularly useful with respect to MEMS gyros which exhibit a high degree of accuracy with respect to short term angular changes (for example, in time intervals up to 10 to 30 seconds) but a significant amount of drift with respect to long term angular changes. By way of example, some MEMS gyros can exhibit a drift of 2° per minute. Accordingly, a slaving function can be applied to compensate for this drift in a way that removes the effects of centripetal acceleration during turns such that the gyro reference corresponds over time more closely to the Earth's gravitational axis irrespective of the aircraft performing turns.

Although the centripetal acceleration method that has been brought to light herein has been described in terms of aircraft, it enjoys broader applicability. While a boat is subject to movement responsive to wind moving over the water, the boat is also subject to the movement of the water over the ground. That is, a boat can be subject to two moving ambients in relation to the ground. Based on the movement of a boat or other such floating platform, the approach of the present disclosure can be used, for example, to compute tidal flow in saltwater or water flow in a river.

The foregoing description of the invention has been presented for purposes of illustration and description. It is not intended to be exhaustive or to limit the invention to the precise form or forms disclosed, and other modifications and variations may be possible in light of the above teachings wherein those of skill in the art will recognize certain modifications, permutations, additions and sub-combinations thereof.

What is claimed is:

1. A method for determining an airspeed of an aircraft in flight during a turn, said method comprising:
    characterizing the flight of the aircraft in terms of Earth-based reference system data for a first position and a second position of the aircraft that are separated by a time increment;
    determining a centripetal acceleration of the aircraft based on the Earth-based reference system data for the first and second positions in conjunction with the time increment;
    establishing a rate of rotation corresponding to the time increment in an aircraft-based reference system; and
    determining the airspeed based on the centripetal acceleration and the rate of rotation.

2. The method of claim 1 wherein characterizing uses the Earth-based reference system data as GPS data that is generated by a GPS system that is carried by the aircraft.

3. The method of claim 2 wherein the GPS data comprises a first GPS packet for the first position and a second GPS packet for the second position.

4. The method of claim 3 wherein determining the airspeed uses no more than the GPS data and the rate of rotation as input values.

5. The method of claim 3 wherein the GPS data for each of the first and second GPS packets is characterized as a groundspeed vector including a magnitude and a track angle.

6. The method of claim 3 wherein the GPS data for each of the first and second GPS packets is characterized by a north component and an east component of groundspeed.

7. The method of claim 1, further comprising:
    resolving a difference between the Earth-based reference system data for a first groundspeed vector at the first position and a second groundspeed vector at the second position into northing components and easting components and determining the centripetal acceleration based on a change in the northing component from the first position to the second position, a change in the easting component from the first position to the second position and the time increment.

8. The method of claim 7 further comprising:
representing the northing component change as $\Delta V_N$, the easting component change as $\Delta V_E$, the time difference as $\Delta t$, and determining the centripetal acceleration, $\alpha$, as $$|\alpha| = \sqrt{\left(\frac{\Delta V_N}{\Delta t}\right)^2 + \left(\frac{\Delta V_E}{\Delta t}\right)^2}.$$

9. The method of claim 7, further comprising:
determining a vertical velocity acceleration;
comparing the vertical velocity acceleration to a groundspeed-heading change acceleration; and
selecting one of a two dimensional acceleration vector or a three dimensional acceleration vector for the centripetal acceleration based on the comparison.

10. The method of claim 1 wherein determining the airspeed uses the expression:

$$V = \alpha/\omega$$

where V is the airspeed, $\alpha$ is the centripetal acceleration and $\omega$ is the rate of rotation.

11. The method of claim 1 wherein determining the rate of rotation includes monitoring an output of a rate gyro onboard the aircraft which is indicative of changes in a yaw orientation of the aircraft.

12. The method of claim 11 wherein monitoring the output of the rate gyro includes reading a plurality of outputs of the rate gyro during the time increment and averaging the plurality of outputs to serve as the rate of rotation.

13. The method of claim 1 wherein establishing the rate of rotation includes reading a heading gyro to determine a first heading for the first position and a second heading for the second position and determining the rate of rotation based on a difference between the first position heading and the second position heading in conjunction with the time increment.

14. The method of claim 1, further comprising:
prior to said characterizing, providing a GPS system that is carried by the aircraft which GPS system outputs GPS data as a series of GPS packets for selective use as the Earth-based reference system data such that a first packet is selected from the series in association with the first position and a second packet is selected from the series subsequent to the first packet and the second packet is associated with the second position.

15. The method of claim 14, further comprising:
saving at least a portion of the series of GPS packets in a rolling buffer for selection of at least the first packet therefrom based on a comparison to a current packet that terminates the series of GPS packets.

16. The method of claim 14, further comprising:
applying a packet selection interval to the series of GPS packets such that the first selected packet and the second selected packet are spaced apart by a predetermined number of unused packets.

17. The method of claim 14, further comprising:
applying a packet selection interval to the series of GPS packets such that the first selected packet and the second selected packet are spaced apart by at least a predetermined amount of time.

18. The method of claim 14, further comprising:
applying a packet selection interval to the series of GPS packets having a duration that is based on a rounding error in the GPS data such that the first selected packet and the second selected packet are spaced apart in time by at least a predetermined amount of time.

19. The method of claim 1, further comprising:
at least one of (i) displaying the airspeed and (ii) providing the airspeed to a control system of the aircraft.

20. An apparatus for determining an airspeed of an aircraft in flight during a turn, said apparatus comprising:
a GPS receiver for characterizing the flight of the aircraft in terms of Earth-based reference system data for a first position and a second position of the aircraft that are separated by a time increment;
a processor configured for
determining a centripetal acceleration based on the Earth-based reference system data for the first and second positions in conjunction with the time increment,
establishing a rate of rotation corresponding to the time increment in an aircraft-based reference system, and
determining the airspeed based on the centripetal acceleration and the rate of rotation.

21. The apparatus of claim 20, further comprising:
a rate sensor for monitoring a rate of change in a yaw orientation of the aircraft; and
said processor further configured for generating the rate of rotation based on the rate of change in the yaw orientation.

22. The apparatus of claim 20, further comprising:
a heading gyro for producing a first heading for the first position and a second heading for the second position; and
said processor further configured for determining the rate of rotation based on a difference between the first position heading and the second position heading in conjunction with the time increment.

23. A method for monitoring the flight of an aircraft, the aircraft carrying a GPS system which outputs GPS data as a series of GPS packets for selective use as Earth-based reference system data, said method comprising:
periodically monitoring at least selected ones of the series of GPS packets to serve as the Earth-based reference system data for detecting that the aircraft is engaged in a turn based on a track angle that forms part of each GPS packet;
detecting a turn as characterized by a change in the track angle from a prior packet corresponding to a prior position of the aircraft to a new packet corresponding to a new position of the aircraft;
determining a centripetal acceleration based on the prior packet, the new packet and a time increment that separates the prior packet and the new packet;
establishing a rate of rotation corresponding to the time increment in an aircraft-based reference system; and
determining the airspeed based on the centripetal acceleration and the rate of rotation.

24. An instrument, comprising:
a GPS receiver for characterizing the movement of a craft that is supported by a moving ambient in terms of Earth-based reference system data for a first position and a second position of the craft that are separated by a time increment;

at least a selected one of a heading gyro to provide a heading output for tracking a heading of the craft in a craft-based reference system and a rate sensor for monitoring a rate of change of a yaw orientation of the craft in the craft-based reference system;

a processor configured for determining a centripetal acceleration based on the Earth-based reference system data for the first and second positions in conjunction with the time increment, establishing a rate of rotation corresponding to the time increment in the craft-based reference system based on the heading output if the heading gyro is selected or based on the rate of change of the yaw orientation if the rate sensor is selected, and determining a velocity of the craft in a turn relative to the moving ambient based on the centripetal acceleration and the rate of rotation.

25. A method for monitoring the flight of an aircraft, the aircraft carrying a GPS system which outputs GPS data as a series of GPS packets, said method comprising:

a) at least periodically monitoring selected ones of the series of GPS packets for detecting that the aircraft is engaged in a turn based on a track angle that forms part of each GPS packet as characterized by a change in the track angle from a prior packet corresponding to a prior position of the aircraft to a subsequent packet corresponding to a subsequent position of the aircraft;

b) responsive to detecting a turn, determining a centripetal acceleration of the aircraft based on the prior packet, the subsequent packet and a time increment that separates the prior packet and the subsequent packet;

c) establishing a rate of rotation of the aircraft corresponding to the time increment in an aircraft-based reference system; and d) determining an airspeed of the aircraft based on the centripetal acceleration and the rate of rotation.

26. The method of claim 25, further comprising:

repeating (a)-(d) for at least one additional packet corresponding to at least one additional position of the aircraft wherein the additional packet serves as the aforerecited subsequent packet and the aforerecited subsequent packet serves as the aforerecited prior packet to determine a subsequent airspeed of the aircraft based on the centripetal acceleration and the rate of rotation.

27. The method of claim 25, further comprising:

e) responsive to detecting that a turn is not in progress, performing at least one of displaying an indication to a pilot of the aircraft and initiating an output to an aircraft control system.

28. The method of claim 25 further comprising:

e) responsive to detecting a turn, switching an autopilot from maintaining a GPS groundspeed to maintaining airspeed as determined based on the centripetal acceleration and the rate of rotation.

29. A method for monitoring the flight of an aircraft, said method comprising:

periodically monitoring a change in a yaw orientation of the aircraft;

performing a turn detection procedure based at least in part on a current value of the change in the yaw orientation;

responsive to detecting a turn, characterizing the flight of the aircraft in terms of Earth-based reference system data for a first position and a second position of the aircraft that are separated by a time increment;

determining a centripetal acceleration of the aircraft based on the Earth-based reference system data for the first and second positions in conjunction with the time increment;

establishing a rate of rotation corresponding to the time increment in an aircraft-based reference system; and determining an airspeed of the aircraft based on the centripetal acceleration and the rate of rotation.

30. The method of claim 29, wherein said turn detection procedure comprises:

comparing a current value of the change in yaw orientation to a yaw window minimum value as a threshold for purposes of detecting that the aircraft is engaged in a turn.

31. The method of claim 30, further comprising:

specifying the window minimum value to include a minimum change in yaw orientation of the aircraft for a specified time period.

32. The method of claim 31 including selecting the minimum change in yaw orientation and the specified time period based, at least in part, on a standard rate turn for the aircraft.

33. The method of claim 29, said turn detection procedure comprising:

specifying a window minimum value to include a minimum change in the yaw orientation of the aircraft for a specified time period;

summing a series of yaw orientation readings obtained during the specified time period to establish a total change in the yaw orientation over the specified time period; and comparing the total change in the yaw orientation to the yaw window minimum value as a threshold to detect that the aircraft is engaged in a turn.

34. The method of claim 33, said turn detection procedure further comprising:

before said summing, testing an initial yaw orientation reading against a trigger threshold to determine that the initial yaw orientation reading is responsive to an actual turn, as opposed to momentary heading deviations of the aircraft.

35. The method of claim 33 further comprising:

generating the series of yaw orientation readings based on an output of a selected one of a heading gyro and a yaw rate gyro.

* * * * *